US012812724B2

(12) United States Patent
Sun et al.

(10) Patent No.: US 12,812,724 B2
(45) Date of Patent: Nov. 24, 2026

(54) DOWNLILNK SMALL DATA TRANSMISSION PROCESS PERFORMED BY TERMINAL IN RRC INACTIVE STATE

(71) Applicant: DATANG MOBILE COMMUNICATIONS EQUIPMENT CO., LTD., Beijing (CN)

(72) Inventors: Jiancheng Sun, Beijing (CN); Jing Fu, Beijing (CN); Jinhua Miao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 188 days.

(21) Appl. No.: 18/698,788

(22) PCT Filed: Oct. 21, 2022

(86) PCT No.: PCT/CN2022/126771
§ 371 (c)(1),
(2) Date: Apr. 5, 2024

(87) PCT Pub. No.: WO2023/066383
PCT Pub. Date: Apr. 27, 2023

(65) Prior Publication Data

US 2024/0414802 A1 Dec. 12, 2024

(30) Foreign Application Priority Data

Oct. 22, 2021 (CN) ........................ 202111236396.6

(51) Int. Cl.
*H04W 76/27* (2018.01)
*H04W 68/02* (2009.01)

(52) U.S. Cl.
CPC .......... *H04W 76/27* (2018.02); *H04W 68/02* (2013.01)

(58) Field of Classification Search
CPC ..... H04W 76/27; H04W 68/02; H04W 76/10; H04W 52/48; H04W 28/0247;
(Continued)

(56) References Cited

U.S. PATENT DOCUMENTS

2006/0075119 A1* 4/2006 Hussain ................ H04L 69/163 709/227
2008/0165795 A1* 7/2008 Baruch .................. H04L 49/90 370/421
(Continued)

FOREIGN PATENT DOCUMENTS

CN 102340754 A 2/2012
CN 103841547 A 6/2014
(Continued)

OTHER PUBLICATIONS

The first office action issued in Chinese corresponding application 202111236396.6, mailed on Nov. 3, 2025.
(Continued)

*Primary Examiner* — Mewale A Ambaye
(74) *Attorney, Agent, or Firm* — KILPATRICK TOWNSEND & STOCKTON LLP

(57) ABSTRACT

The present application provides a data transmission method, a device, and a storage medium. An anchor base station initiates radio paging to a terminal, and initiates RAN paging to a non-anchor base station in an RNA after receiving a downlink small data packet from a core network that is sent to the terminal in an RRC Inactive state; a radio paging message and an RAN paging message include indication information on downlink small data transmission (SDT); and after receiving the radio paging message, the terminal resumes SDT-related configuration in the RRC
(Continued)

Inactive state, and the anchor base station sends the downlink small data packet to the terminal directly or through the non-anchor base station.

20 Claims, 10 Drawing Sheets

(58) Field of Classification Search
CPC ..... H04W 68/00; H04W 72/21; H04W 72/23; H04W 72/51; Y02D 30/70
See application file for complete search history.

(56) References Cited

U.S. PATENT DOCUMENTS

| | | | | |
|---|---|---|---|---|
| 2012/0020250 | A1 * | 1/2012 | Sundararaman | ...... H04L 47/621 370/256 |
| 2015/0304799 | A1 | 10/2015 | Park et al. | |
| 2021/0307100 | A1 | 9/2021 | Talebi Fard et al. | |

FOREIGN PATENT DOCUMENTS

| | | | | |
|---|---|---|---|---|
| CN | 107370573 | A | 11/2017 | |
| CN | 108738139 | A | 11/2018 | |
| CN | 111800888 | A | 10/2020 | |
| CN | 112534901 | A | 3/2021 | |
| CN | 113473450 | A | 10/2021 | |
| EP | 3993558 | A1 | 5/2022 | |
| GB | 2593537 | A | 9/2021 | |
| KR | 20210005513 | A | 1/2021 | |
| WO | 2018151546 | A1 | 8/2018 | |
| WO | WO-2020036753 | A1 * | 2/2020 | ........... H04W 76/19 |
| WO | 2021031103 | A1 | 2/2021 | |
| WO | 2021165076 | A1 | 8/2021 | |
| WO | WO-2021161621 | A1 * | 8/2021 | ........... H04L 5/0035 |
| WO | 2021197036 | A1 | 10/2021 | |

OTHER PUBLICATIONS

Huawei, HiSilicon, “Discussion on NAS impact of small data transmission (SDT)”, 3GPP TSG CT WG1 Meeting #130-e, Electronic meeting, May 20-28, 2021, total 4 pages, C1-213396.
ZTE, “Discussion on SDT with/without UE context relocation”, 3GPP TSG-RAN WG3 #111-e, Jan. 25-Feb. 4, 2021, Online, total 6 pages, R3-210187.
The extended European search report received in the counterpart European Application 22882987.5, mailed on Jan. 2, 2025.
State Intellectual Property Office of the People’s Republic of China, International Search Report and written opinion issued in Application No. PCT/CN2022/126771, Jan. 19, 2023, 13 pages.
The third office action and search report issued in Chinese corresponding application 202111236396.6, mailed on Aug. 29, 2026.

* cited by examiner

DOWNLILNK SMALL DATA TRANSMISSION PROCESS PERFORMED BY TERMINAL IN RRC INACTIVE STATE

CROSS-REFERENCE TO RELATED APPLICATIONS

This application is a National Stage of International Application No. PCT/CN2022/126771, filed on Oct. 21, 2022, which claims priority to Chinese Patent Application No. 202111236396.6, filed to China National Intellectual Property Administration on Oct. 22, 2021 and entitled "DATA TRANSMISSION METHOD, DEVICE, AND STORAGE MEDIUM", both of which are hereby incorporated by reference in their entireties.

FIELD

The present application relates to the field of communication and, in particular, to a data transmission method, a device, and a storage medium.

BACKGROUND

The 3rd Generation Partnership Project (3GPP) proposes a new RRC state, i.e., an RRC Inactive state, on the basis of a Radio Resource Control (RRC) Connected state (RRC_Connected) and an RRC Idle state (RRC_Idle), for a next generation (e.g., the 5th Generation, 5G) wireless communication network. The RRC Inactive state aims at achieving power saving and acceptable access delay.

When User Equipment (UE) is in the RRC Inactive state, from the perspective of a core network, the UE is still in a CM_Connected state (Non-access Stratum state), both of a Radio Access Network (RAN) and the UE retain a context of an access stratum of the UE, but radio resources of the UE have been released. Similar to the UE in the RRC Idle state, the UE in the RRC Inactive state can perform cell reselection and receive broadcast system information and paging messages, except that the UE can be rapidly resumed to a RRC connected state.

In the prior art, if the UE in the RRC Inactive state needs to transmit uplink and downlink data packets, the UE has to be resumed from the RRC Inactive state to the RRC Connected state firstly, and then, transmit the uplink and downlink data packets in the RRC Connected state.

For the transmission of few downlink small data packets or Non-access Stratum (NAS) messages in the prior art, it is also necessary that the UE resumes from the RRC Inactive state to the RRC Connected state; in addition, if the UE is not under an anchor base station, anchor transfer and path changing are also needed. The current transmission process is too cumbersome, and the efficiency is also low.

SUMMARY

The present application provides a data transmission method, a device, and a storage medium and a downlink small data transmission process performed by a terminal in an RRC Inactive state is simpler and more efficient.

In one embodiment of the present application provides a data transmission method, applied to a terminal, where the method includes:

receiving a radio paging message from a first base station to the terminal, where the radio paging message includes indication information on downlink small data transmission (SDT), the terminal is in a radio resource control (RRC) inactive (Inactive) state, and the first base station is an anchor base station or a non-anchor base station;

resuming SDT-related configuration in the RRC Inactive state according to the indication information on the downlink SDT included in the radio paging message; and receiving, according to the resumed SDT-related configuration, a downlink small data packet sent by the first base station.

In a possible design, the resuming the SDT-related configuration in the RRC Inactive state includes:

resuming SDT-related radio bearer configuration according to preset SDT-related radio bearer configuration information, and sending an RRC resume request message to the first base station, the RRC resume request message being configured to request the first base station to resume SDT-related radio bearer.

In a possible design, the preset SDT-related configuration information includes SDT configuration information provided by the anchor base station when the terminal enters the RRC Inactive state, or includes preset default SDT configuration information.

In a possible design, the downlink small data packet includes downlink SDT data or non-access stratum (NAS) signaling.

In a possible design, after the resuming the SDT-related configuration in the RRC Inactive state, the method further includes:

receiving an RRC resume message sent by the first base station; and resuming the terminal from the RRC Inactive state to an RRC connected (Connected) state according to the RRC resume message.

In a possible design, after the resuming the SDT-related configuration in the RRC Inactive state, the method further includes:

receiving an RRC release message sent by the first base station; and stopping to receive the SDT downlink small data packet according to the RRC release message, and entering an RRC idle (Idle) state or keeping in the RRC Inactive state.

In one embodiment of the present application provides a data transmission method, applied to an anchor base station, where the method includes:

receiving a downlink small data packet from a core network that is to be sent to a terminal in an RRC Inactive state;

sending a radio paging message to the terminal, and/or, sending a radio access network (RAN) paging message to a non-anchor base station in an RAN-based notification area (RNA), the RAN paging message being configured to instruct the non-anchor base station to send the radio paging message to the terminal; where the RAN paging message and the radio paging message include indication information on downlink small data transmission (SDT); and if it is determined that the terminal responds to the radio paging message, sending the downlink small data packet to the terminal directly or through the non-anchor base station.

In a possible design, the sending the downlink small data packet to the terminal through the non-anchor base station includes:

if it is determined that the terminal responds to the radio paging message sent by the non-anchor base station, sending terminal context information of the terminal to the non-anchor base station; and after performing first processing on the downlink small data packet, sending the processed downlink small data packet to the non-anchor base station, and the non-anchor base station performs second processing on the received processed downlink small data packet according to the terminal context information, and sends the downlink small data packet subjected to the second processing to the terminal.

In a possible design, the sending the downlink small data packet to the terminal directly includes:

if it is determined that the terminal responds to the radio paging message from the anchor base station, performing first processing and second processing on the downlink small data packet, and then, sending the downlink small data packet subjected to the first processing and the second processing to the terminal.

In a possible design, the sending the terminal context information of the terminal to the non-anchor base station includes:

receiving a terminal context information request message sent by the non-anchor base station; and sending the terminal context information to the non-anchor base station in response to the terminal context information request message.

In a possible design, the terminal context information request message includes a maximum SDT data processing capacity of the non-anchor base station; and the sending the terminal context information of the terminal to the non-anchor base station in response to the terminal context information request message includes:

if it is determined that a data volume of the downlink small data packet satisfies the maximum data processing capacity of the non-anchor base station, determining that the downlink small data packet is transmitted by adopting an SDT process, and sending the terminal context information of the terminal to the non-anchor base station; where the terminal context information includes SDT-related configuration information of the terminal.

In a possible design, the terminal context information is SDT-related configuration information of the terminal; or the terminal context information is full context information of the terminal, where the full context information includes the SDT-related configuration information of the terminal.

In a possible design, the method further includes:

if it is determined that the data volume of the downlink small data packet does not satisfy the maximum data processing capacity of the non-anchor base station, determining that the downlink small data packet is transmitted without adopting the SDT process, and sending full terminal context information of the terminal and the downlink small data packet to the non-anchor base station to perform anchor transfer.

In a possible design, if the downlink small data packet is non-access stratum (NAS) signaling, the first processing includes: packaging the NAS signaling in an RRC message, and performing packet data convergence protocol (PDCP) processing; or, if the downlink small data packet is downlink SDT data, the first processing includes: performing service data adaptation protocol (SDAP) processing and PDCP processing on the downlink SDT data.

In a possible design, the second processing includes at least one of the following: physical layer processing, media access control (MAC) layer processing, or radio link control (RLC) layer processing.

In a possible design, the sending the processed downlink small data packet to the non-anchor base station includes:

if the downlink small data packet is downlink SDT data, sending the processed downlink small data packet to the non-anchor base station through a downlink SDT data forwarding tunnel allocated by the non-anchor base station; or if the downlink small data packet is NAS signaling, sending the processed downlink small data packet to the non-anchor base station through an Xn interface.

In a possible design, the method further includes:

after it is determined that sending the downlink small data packet is completed, generating an RRC release message, and transmitting the RRC release message to the terminal, and the terminal stops to receive the downlink small data packet according to the RRC release message, and enters an RRC Idle state or keeps in the RRC Inactive state.

In one embodiment of the present application provides a data transmission method, applied to a non-anchor base station, where the method includes:

receiving a radio access network (RAN) paging message sent by an anchor base station, the RAN paging message being sent by the anchor base station to the non-anchor base station in an RNA;

initiating radio paging to a terminal according to the RAN paging message from the anchor base station, where the RAN paging message and a radio paging message include indication information on downlink small data transmission (SDT), and the terminal is in an RRC Inactive state;

if it is determined that the terminal responds to the radio paging message from the non-anchor base station, acquiring terminal context information of the terminal from the anchor base station;

acquiring a downlink small data packet subjected to first processing from the anchor base station; and performing second processing on the downlink small data packet according to the terminal context information, and sending the downlink small data packet subjected to the second processing to the terminal.

In a possible design, the acquiring the terminal context information of the terminal from the anchor base station includes:

sending a terminal context information request message to the anchor base station; and receiving the terminal context information of the terminal that is sent by the anchor base station according to the terminal context information request message.

In a possible design, the terminal context information request message includes a maximum data processing capacity of the non-anchor base station; and the receiving the terminal context information of the terminal that is sent by the anchor base station according to the terminal context information request message includes:

receiving the terminal context information of the terminal that is sent by the anchor base station after it is determined that a data volume of the downlink small data packet satisfies the maximum data processing capacity of the non-anchor base station.

In a possible design, after the sending the terminal context information request message to the anchor base station, the method further includes:

receiving full terminal context information of the terminal and the downlink small data packet that are sent by the anchor base station after it is determined that a data volume of the downlink small data packet does not satisfy a maximum data processing capacity of the non-anchor base station;

converting into a new anchor base station according to the full terminal context information of the terminal, and sending an RRC resume message to the terminal, and the terminal resumes from the RRC Inactive state to an RRC Connected state; and performing first processing and second processing on the downlink small data packet according to the full terminal context information of the terminal, and then, sending the downlink small data packet subjected to the first processing and the second processing to the terminal.

In a possible design, the acquiring the downlink small data packet subjected to the first processing from the anchor base station includes:

if the downlink small data packet is downlink SDT data, allocating a downlink SDT data forwarding tunnel to the downlink SDT data, and sending downlink SDT data forwarding tunnel information to the anchor base station;

receiving the downlink small data packet subjected to the first processing sent by the anchor base station through the downlink SDT data forwarding tunnel; or if the downlink small data packet is NAS signaling, receiving the downlink small data packet subjected to the first processing sent by the anchor base station through an Xn interface.

In one embodiment of the present application provides a terminal, including a memory, a transceiver, and a processor;

the memory being configured to store a computer program; the transceiver being configured to transceive data under control of the processor; and the processor being configured to read the computer program in the memory and perform the following operations:

receiving a radio paging message from a first base station to the terminal, where the radio paging message includes indication information on downlink small data transmission (SDT), the terminal is in a radio resource control (RRC) inactive (Inactive) state, and the first base station is an anchor base station or a non-anchor base station;

resuming SDT-related configuration in the RRC Inactive state according to the indication information on the downlink SDT included in the radio paging message; and receiving, according to the resumed SDT-related configuration, a downlink small data packet sent by the first base station.

In a possible design, when resuming the SDT-related configuration in the RRC Inactive state according to preset SDT-related configuration information, the processor is configured to:

resume SDT-related radio bearer configuration according to preset SDT-related radio bearer configuration information, and send an RRC resume request message to the first base station, the RRC resume request message being configured to request the first base station to resume SDT-related radio bearer.

In a possible design, the preset SDT-related configuration information includes SDT configuration information provided by the anchor base station when the terminal enters the RRC Inactive state, or includes preset default SDT configuration information.

In a possible design, the downlink small data packet includes downlink SDT data or non-access stratum (NAS) signaling.

In a possible design, after resuming the SDT-related configuration in the RRC Inactive state, the processor is further configured to:

receive an RRC resume message sent by the first base station; and resume the terminal from the RRC Inactive state to an RRC connected (Connected) state according to the RRC resume message.

In a possible design, after resuming the SDT-related configuration in the RRC Inactive state, the processor is further configured to:

receive an RRC release message sent by the first base station; and stop to receive the SDT downlink small data packet according to the RRC release message, and enter an RRC idle (Idle) state or keep in the RRC Inactive state.

In one embodiment of the present application provides an anchor base station, including a memory, a transceiver, and a processor:

the memory being configured to store a computer program; the transceiver being configured to transceive data under control of the processor; and the processor being configured to read the computer program in the memory and perform the following operations:

receiving a downlink small data packet from a core network that is to be sent to a terminal in an RRC Inactive state;

sending a radio paging message to the terminal, and/or, sending a radio access network (RAN) paging message to a non-anchor base station in an RAN-based notification area (RNA), the RAN paging message being configured to instruct the non-anchor base station to send the radio paging message to the terminal; where the RAN paging message and the radio paging message include indication information on downlink small data transmission (SDT); and if it is determined that the terminal responds to the radio paging message, sending the downlink small data packet to the terminal directly or through the non-anchor base station.

In a possible design, when sending the downlink small data packet to the terminal through the non-anchor base station, the processor is configured to:

if it is determined that the terminal responds to the radio paging message sent by the non-anchor base station, send terminal context information of the terminal to the non-anchor base station; and after performing first processing on the downlink small data packet, send the processed downlink small data packet to the non-anchor base station, and the non-anchor base station performs second processing on the received processed downlink small data packet according to the terminal context information, and sends the downlink small data packet subjected to the second processing to the terminal.

In a possible design, when sending the downlink small data packet to the terminal directly, the processor is configured to:

if it is determined that the terminal responds to the radio paging message from the anchor base station, perform first processing and second processing on the downlink small data packet, and then, send the downlink small data packet subjected to the first processing and the second processing to the terminal.

In a possible design, when sending the terminal context information of the terminal to the non-anchor base station, the processor is configured to:

receive a terminal context information request message sent by the non-anchor base station; and send the terminal context information to the non-anchor base station in response to the terminal context information request message.

In a possible design, the terminal context information request message includes a maximum SDT data processing capacity of the non-anchor base station; and when sending the terminal context information to the non-anchor base station in response to the terminal context information request message, the processor is configured to:

if it is determined that a data volume of the downlink small data packet satisfies the maximum data processing capacity of the non-anchor base station, determine that the downlink small data packet is transmitted by adopting an SDT process, and send the terminal context information to the non-anchor base station.

In a possible design, the terminal context information is SDT-related configuration information of the terminal; or the terminal context information is full context information of the terminal, where the full context information includes the SDT-related configuration information of the terminal.

In a possible design, the processor is further configured to:

if it is determined that the data volume of the downlink small data packet does not satisfy the maximum data processing capacity of the non-anchor base station, determine that the downlink small data packet is transmitted without adopting the SDT process, and send full terminal context information of the terminal and the downlink small data packet to the non-anchor base station to perform anchor transfer.

In a possible design, the second processing includes at least one of the following: physical layer processing, media access control (MAC) layer processing, or radio link control (RLC) layer processing;

if the downlink small data packet is non-access stratum (NAS) signaling, the first processing includes: packaging the NAS signaling in an RRC message, and performing packet data convergence protocol (PDCP) processing; or, if the downlink small data packet is downlink SDT data, the first processing includes: performing service data adaptation protocol (SDAP) processing and PDCP processing on the downlink SDT data.

In a possible design, when sending the processed downlink small data packet to the non-anchor base station, the processor is configured to:

if the downlink small data packet is downlink SDT data, send the processed downlink small data packet to the non-anchor base station through a downlink SDT data forwarding tunnel allocated by the non-anchor base station; or if the downlink small data packet is NAS signaling, send the processed downlink small data packet to the non-anchor base station through an Xn interface.

In a possible design, the processor is further configured to:

after it is determined that sending the downlink small data packet is completed, generate an RRC release message, and transmit the RRC release message to the terminal, and the terminal stops to receive the downlink small data packet according to the RRC release message, and enters an RRC Idle state or keeps in the RRC Inactive state.

In one embodiment of the present application provides a non-anchor base station, including a memory, a transceiver, and a processor:

the memory being configured to store a computer program; the transceiver being configured to transceive data under control of the processor; and the processor being configured to read the computer program in the memory and perform the following operations:

receiving a radio access network (RAN) paging message sent by an anchor base station, the RAN paging message being sent by the anchor base station to the non-anchor base station in an RNA;

initiating radio paging to a terminal according to the RAN paging message from the anchor base station, where the RAN paging message and a radio paging message include indication information on downlink small data transmission (SDT), and the terminal is in an RRC Inactive state;

if it is determined that the terminal responds to the radio paging message from the non-anchor base station, acquiring terminal context information of the terminal from the anchor base station;

acquiring a downlink small data packet subjected to first processing from the anchor base station; and performing second processing on the downlink small data packet according to the terminal context information, and sending the downlink small data packet subjected to the second processing to the terminal.

In a possible design, when acquiring the terminal context information of the terminal from the anchor base station, the processor is configured to:

send a terminal context information request message to the anchor base station; and receive the terminal context information of the terminal that is sent by the anchor base station according to the terminal context information request message.

In a possible design, the terminal context information request message includes a maximum data processing capacity of the non-anchor base station; and when receiving the terminal context information of the terminal that is sent by the anchor base station according to the terminal context information request message, the processor is configured to:

receive the terminal context information of the terminal that is sent by the anchor base station after it is determined that a data volume of the downlink small data packet satisfies the maximum data processing capacity of the non-anchor base station.

In a possible design, after sending the terminal context information request message to the anchor base station, the processor is further configured to:

receive full context information of the terminal and the downlink small data packet that are sent by the anchor base station after it is determined that the a data volume of the downlink small data packet does not satisfy a maximum data processing capacity of the non-anchor base station;

convert into a new anchor base station according to the full context information of the terminal, and send an RRC resume message to the terminal, and the terminal resumes from the RRC Inactive state to an RRC Connected state; and perform first processing and second processing on the downlink small data packet according to the full context information of the terminal, and then, send the downlink small data packet subjected to the first processing and the second processing to the terminal.

In a possible design, when acquiring the downlink small data packet subjected to the first processing from the anchor base station, the processor is configured to:

if the downlink small data packet is downlink SDT data, allocate a downlink SDT data forwarding tunnel to the downlink SDT data, and send downlink SDT data forwarding tunnel information to the anchor base station;

receive the downlink small data packet subjected to the first processing sent by the anchor base station through the downlink SDT data forwarding tunnel; or if the downlink small data packet is NAS signaling, receive the downlink small data packet subjected to the first processing sent by the anchor base station through an Xn interface.

In one embodiment of the present application provides a terminal, including:

a receiving unit configured to receive a radio paging message from a first base station to the terminal, where the radio paging message includes indication information on downlink small data transmission (SDT), the terminal is in a radio resource control (RRC) inactive (Inactive) state, and the first base station is an anchor base station or a non-anchor base station; and a processing unit configured to resume SDT-related configuration in the RRC Inactive state according to the indication information on the downlink SDT included in the radio paging message;

where the receiving unit is further configured to receive, according to the resumed SDT-related configuration, a downlink small data packet sent by the first base station.

In one embodiment of the present application provides an anchor base station, including:

a receiving unit configured to receive a downlink small data packet from a core network that is to be sent to a terminal in an RRC Inactive state;

a paging unit configured to send a radio paging message to the terminal, and/or, send a radio access network (RAN) paging message to a non-anchor base station in an RAN-based notification area (RNA), the RAN paging message being configured to instruct the non-anchor base station to send the radio paging message to the terminal; where the RAN paging message and the radio paging message include indication information on downlink small data transmission (SDT); and a sending unit configured to, if it is determined that the terminal responds to the radio paging message, send the downlink small data packet to the terminal directly or through the non-anchor base station.

In one embodiment of the present application provides a non-anchor base station, including:

a receiving unit configured to receive a radio access network (RAN) paging message sent by an anchor base station, the RAN paging message being sent by the anchor base station to the non-anchor base station in an RNA;

a paging unit configured to initiate radio paging to a terminal according to the RAN paging message from the anchor base station, where the RAN paging message and a radio paging message include indication information on downlink small data transmission (SDT), and the terminal is in an RRC Inactive state;

an acquisition unit configured to, if it is determined that the terminal responds to the radio paging message from the non-anchor base station, acquire terminal context information of the terminal from the anchor base station; and acquire a downlink small data packet subjected to first processing from the anchor base station; and a sending unit configured to perform second processing on the downlink small data packet according to the terminal context information, and send the downlink small data packet subjected to the second processing to the terminal.

In one embodiment of the present application provides a processor-readable storage medium, where the processor-readable storage medium has a computer program stored thereon, and the computer program is configured to cause a processor to perform the method in the embodiments.

The present application provides a data transmission method, a device, and a storage medium. An anchor base station initiates radio paging to a terminal, and initiates RAN paging to a non-anchor base station in an RNA after receiving a downlink small data packet from a core network that is to be sent to the terminal in an RRC Inactive state; a radio paging message and an RAN paging message include indication information on downlink small data transmission (SDT); and after receiving the radio paging message, the terminal may resume SDT-related configuration in the RRC Inactive state according to preset SDT-related configuration information, and the anchor base station may send the downlink small data packet to the terminal directly or through the non-anchor base station. According to the data transmission method in the present application, during downlink small data transmission, the terminal keeps in the RRC Inactive state and only resumes the SDT-related configuration, in this way, the downlink small data packet sent by the anchor base station directly or through the non-anchor base station can be received according to the resumed SDT-related configuration, and a downlink small data transmission process is simpler and more efficient.

It should be understood that the contents described in the summary are not intended to limit key or important features of embodiments of the present application or limit the scope of the present application. Other features of the present application will be easy to understand through the following description.

BRIEF DESCRIPTION OF THE DRAWINGS

To describe the embodiments in the present application clearly, the accompanying drawings required for describing the embodiments will be briefly introduced below. Apparently, the accompanying drawings in the following description are only some embodiments of the present application.

DESCRIPTION OF EMBODIMENTS

Figure 1:
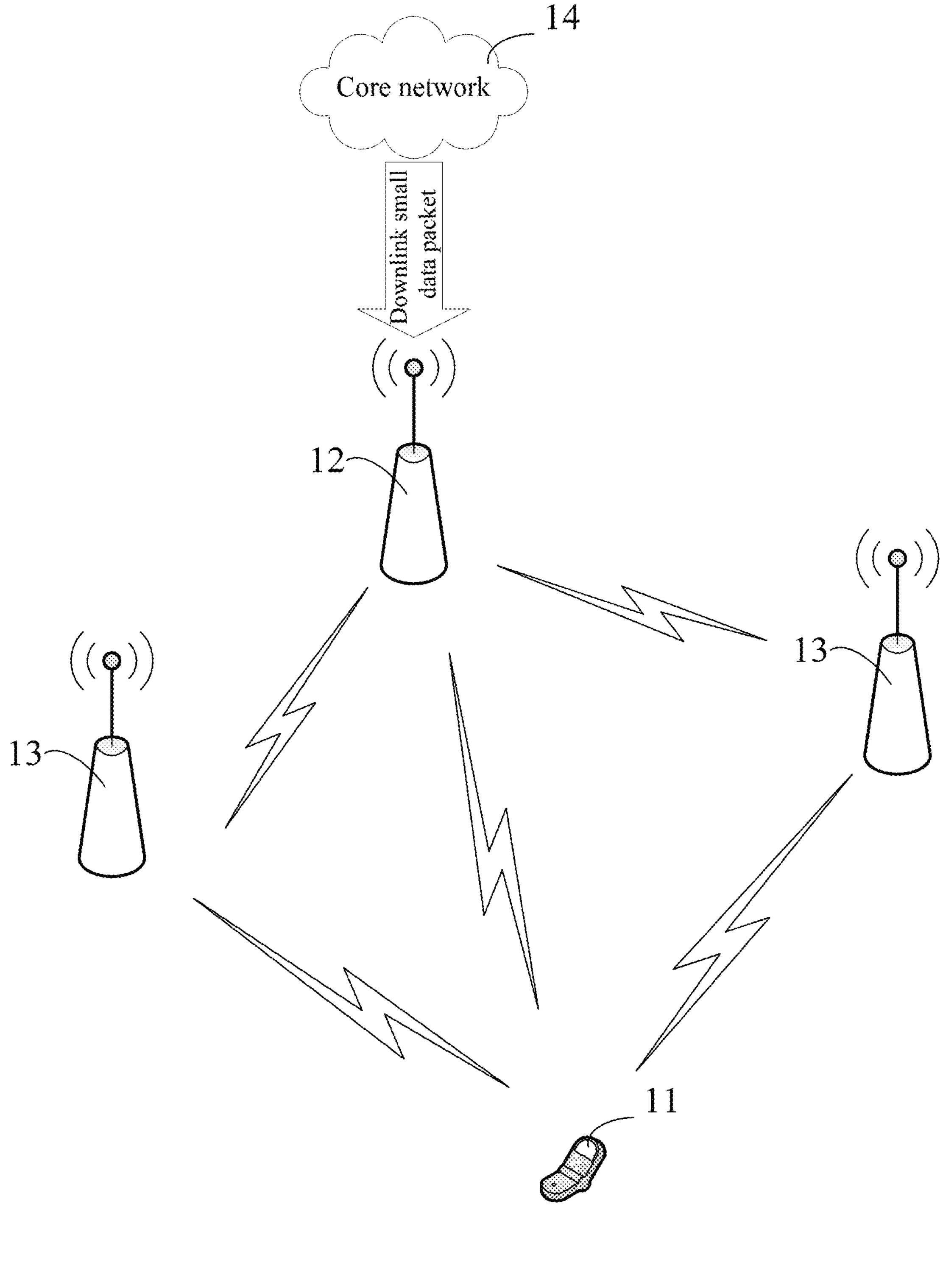
FIG. 1 is a schematic system diagram of a data transmission method provided in an embodiment of the present application.

The term "and/or" described in the present application describes an association relationship among associated objects and denotes that three relationships may exist. For example, A and/or B may denote three situations that A exists alone; A and B exist at the same time; and B exists alone. The character "/" generally denotes that forward and backward associated objects are in an "or" relationship.

The term "a plurality of" in the embodiments of the present application refers to two or more, and other quantifiers are similar to it.

The 3GPP proposes a new RRC state, i.e., an RRC Inactive state, on the basis of an RRC Connected state and an RRC Idle state, for a next generation (e.g., the 5th Generation, 5G) wireless communication network. The RRC Inactive state aims at achieving power saving and acceptable access delay. When UE is in the RRC Inactive state, from the perspective of a core network, the UE is still in a CM_Connected state (Non-access Stratum state), both of an RAN and the UE retain a context of an access stratum of the UE, but radio resources of the UE have been released. Similar to the UE in the RRC Idle state, the UE in the RRC Inactive state can perform cell reselection and receive broadcast system information and paging messages except that the UE can be rapidly resumed to a RRC connected state.

In the prior art, if the UE in the RRC Inactive state needs to transmit uplink and downlink data packets, the UE has to be resumed from the RRC Inactive state to the RRC Connected state firstly, and then, transmit the uplink and downlink data packets in the RRC Connected state.

An anchor base station is a base station where a terminal performs RRC connection before entering the RRC Inactive state (the last service base station). After the terminal enters the RRC Inactive state, the anchor base station still keeps being connected to a core network, that is, from the perspective of the core network, the UE is still in a CM_Connected state (non-access stratum state), at the moment, both of the anchor base station and the terminal retain terminal context information during RRC connection, the terminal is not connected to the anchor base station, and radio resources have been released. The terminal in the RRC Inactive state is similar to the terminal in the RRC Idle state except that it can perform cell reselection and receive broadcast system information and paging messages, In one embodiment, the terminal can be rapidly resumed to the RRC Connected state by radio paging from the anchor base station to the terminal as long as the terminal is located in a coverage area of the anchor base station, and thus, the RRC connection between the terminal and the anchor base station can be resumed. If the terminal moves out of the coverage area of the anchor base station, but does not move out of a RAN (Radio Access Network)-based Notification Area (RAN Notification Area, RNA), the terminal can move in the RNA without updating a core network tracking area, the anchor base station can initiate RAN paging in the RNA, that is, a non-anchor base station in the RNA is notified to initiate radio paging. If the terminal responds to paging in any non-anchor base station in the RNA, the anchor base station may send a context of the terminal to the non-anchor base station to perform anchor transfer and path changing, and the non-anchor base station is used as a new anchor base station to establish an RRC connection with the terminal and a connection with the core network.

However, whether small data transmission can be performed and how to perform small data transmission in the RRC Inactive state have been discussed to a certain extent in the early stage of 5G NR, mainly in the aspect of a data transmission method of a radio, but there have been no clear solutions, and there have been no clear solutions for solving the problem how to deal with small data transmission on a base station side. In the normal RRC Inactive state, the arrival of uplink data or downlink data of the terminal will trigger the terminal to be switched from the RRC Inactive state to the RRC Connected state to complete the sending of data in the RRC Connected state.

However, for the transmission of few downlink small data packets or NAS messages, it is also necessary that the UE resumes from the RRC Inactive state to the RRC Connected state; In one embodiment, if the UE is not under an anchor base station, anchor transfer and path changing are also needed, which makes transmission processes of the downlink small data packets or the NAS messages too cumbersome and the efficiency very low.

In order to solve the above-mentioned problems, the present application provides a data transmission method. An anchor base station initiates radio paging to a terminal, and initiates RAN paging to a non-anchor base station in an RNA after receiving a downlink small data packet from a core network that is to be sent to the terminal in an RRC Inactive state, and the non-anchor base station initiates radio paging to the terminal according to an RAN paging message; a radio paging message and the RAN paging message include indication information on downlink small data transmission (SDT); and after receiving the radio paging message, the terminal can resume SDT-related configuration in the RRC Inactive state according to preset SDT-related configuration information, and the anchor base station may send the downlink small data packet to the terminal directly or through the non-anchor base station. According to the data transmission method in the present application, during downlink small data transmission, the terminal keeps in the RRC Inactive state and only resumes the SDT-related configuration, in this way, the downlink small data packet sent by the anchor base station directly or through the non-anchor base station can be received according to the resumed SDT-related configuration, and a downlink small data transmission process is simpler and more efficient.

Embodiments of the present application provide a data transmission method which is suitable for a system shown in FIG. 1, and the system includes a terminal 11, an anchor base station 12, a non-anchor base station 13, and a core network 14. The terminal 11 is in an RRC Inactive state, the anchor base station 12 initiates radio paging to the terminal 11 and initiates RAN paging to the non-anchor base station 13 in an RNA after receiving a downlink small data packet which needs to be sent to the terminal 11 by the core network 14, and the non-anchor base station 13 initiates radio paging to the terminal 11 according to an RAN paging message; a radio paging message and the RAN paging message include indication information on downlink small data transmission (SDT); and after receiving the radio paging message, the terminal 11 may resume SDT-related configuration in the RRC Inactive state according to preset SDT-related configuration information, the anchor base station 12 may send the downlink small data packet to the terminal 11 directly or through the non-anchor base station 13, and the terminal 11 can receive the downlink small data packet according to the resumed SDT-related configuration.

The embodiments of the present application are suitable for various systems, especially for a 5G system. For example, the suitable system may be a global system of mobile communication (GSM), a code division multiple access (CDMA) system, a Wideband Code Division Multiple Access (WCDMA) general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G New Radio (NR) system, etc. All of the various systems include terminal equipment and network equipment. The system may further include a core network part, such as an Evolved Packet System (EPS) and a 5G system (5GS).

The terminal equipment related to the embodiments of the present application may refer to equipment providing voice and/or data connectivity to a user, handheld equipment with a wireless connection function, or other processing equipment connected to a wireless modem, etc. In different systems, the terminal equipment may also have different names. For example, in a 5G system, the terminal equipment may be referred to as User Equipment (UE). Wireless terminal equipment may communicate with one or more Core Networks (CN) through a Radio Access Network (RAN), the wireless terminal equipment may be mobile terminal equipment, such as a mobile phone (or referred to as “cellular” phone), and a computer with the mobile terminal equipment, such as a portable mobile device, a pocket mobile device, a handheld mobile device, a mobile device built in computer or a vehicle-mounted mobile device, and they exchange languages and/or data with a radio access network. For example, the wireless terminal equipment may be equipment such as a Personal Communication Service (PCS) phone, a cordless phone, a Session Initiated Protocol (SIP) phone, a Wireless Local Loop (WLL) station, and a Personal Digital Assistant (PDA). The wireless terminal equipment may also be referred to as a system, a subscriber unit, a subscriber station, a mobile station, a mobile, a remote station, an access point, a remote terminal, an access terminal, a user terminal, a user agent, and a user device, which is not limited in the embodiments of the present application.

A base station related to the embodiments of the present application may also be other network equipment, where the base station may include cells providing service for a terminal. According to different specific application occasions, the base station may also be referred to as an access point or may be equipment communicating with the wireless terminal equipment on an air interface in an access network through one or more sectors, or other names. The network equipment may be configured to interchange a received aerial frame and an Internet Protocol (IP) packet to be used as a router between the wireless terminal equipment and the rest part of the access network, where the rest part of the access network may include an Internet Protocol (IP) communication network. The network equipment may further coordinate the attribute management for the air interface. For example, the network equipment related to the embodiments of the present application may be network equipment (Base Transceiver Station, BTS) in a Global System for Mobile communications (GSM) or Code Division Multiple Access (CDMA), or network equipment (NodeB) in Wideband Code Division Multiple Access (WCDMA), or evolutional network equipment (evolutional Node B, eNB or e-Node) in a long term evolution (LTE) system, a 5G base station (gNB) in a 5G network architecture (next generation system), or a Home evolved Node B (HeNB), a relay node, a femto, a pico, etc., which is not limited in the embodiments of the present application. In some network structures, the network equipment may include a node of a centralized unit (CU) and a node of a distributed unit (DU), and the centralized unit and the distributed unit may also be geographically separated.

The embodiments of the present application will be described clearly and completely below in conjunction with the accompanying drawings in the embodiments of the present application. Apparently, the described embodiments are only a part of the embodiments of the present application, but not all the embodiments. Based on the embodiments of the present application.

The method and the device are based on the same application concept. Since problem solving principles in the method and the device are similar, implementations of the device and the method may refer to each other, and repetitions thereof will be no longer repeated.

Figure 2:
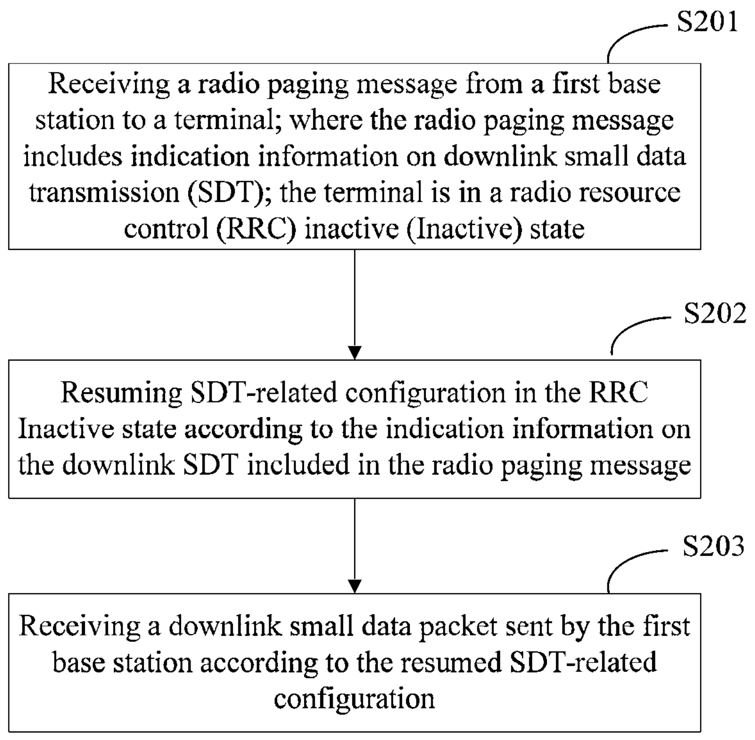
FIG. 2 is a flow diagram of a data transmission method provided in an embodiment of the present application.

FIG. 2 is a flow diagram of a data transmission method provided in the present embodiment. As shown in FIG. 2, the present embodiment provides a data transmission method of which an execution subject is a terminal UE, and the method includes the following specific steps.

S201, receiving a radio paging message from a first base station to a terminal; where the radio paging message includes indication information on downlink small data transmission (SDT); the terminal is in a radio resource control (RRC) inactive (Inactive) state.

The first base station is an anchor base station or a non-anchor base station.

In the present embodiment, for the terminal in the RRC Inactive state, the anchor base station still keeps being connected to a core network, and therefore, the anchor base station can receive downlink small data packet that is to be sent to the terminal, the downlink small data packet includes downlink SDT (Small Data Transmission) data or NAS signaling (such as NAS PDU (protocol data unit)). The anchor base station may initiate radio paging to the terminal in a coverage area thereof and initiate RAN paging to a non-anchor base station in an RNA, and the RAN paging is to notify each non-anchor base station in the RNA to initiate the radio paging to the terminal. In the present embodiment, the radio paging message and an RNA paging message may include indication information on downlink small data transmission (SDT), and the terminal can know, after the radio paging message is received, that there are downlink small data packet needed to be sent to the terminal.

It should be noted that, if the terminal is located in a coverage area of the anchor base station, a radio paging message sent by the anchor base station can be received; and if the terminal is not located in the coverage area of the anchor base station, but is located in a coverage area of the non-anchor base station of the RNA, a radio paging message sent by the non-anchor base station can be received.

S202, resuming SDT-related configuration in the RRC Inactive state according to the indication information on the downlink SDT included in the radio paging message.

In the present embodiment, if the terminal knows, after the radio paging message is received, that there is a downlink small data packet needed to be received, the terminal may keep in the RRC Inactive state and only resume the SDT-related configuration according to preset SDT-related configuration information.

In one embodiment, the preset SDT-related configuration information includes SDT configuration information provided by the anchor base station when the terminal enters the RRC Inactive state (i.e., configuration information for SDT in terminal context information), or includes preset default SDT configuration information. In one embodiment, the SDT-related configuration information is at least SDT DRB (Data radio bearer) configuration. Compared with the terminal needing to resume full configuration of terminal context information when resumed from the RRC Inactive state to the RRC Connected state, the terminal in the present embodiment only resumes the SDT-related configuration, can keep in the RRC Inactive state without resuming to the RRC Connected state to be simpler in process and higher in efficiency.

Further, after resuming the SDT-related configuration, the terminal may initiate a Resume process to the first base station, that is, send an RRC resume request (RRCResumeRequest) to the first base station, where the RRC resume request may include mt-access (response paging) information which represents that the paging is received by the terminal, requests the first base station to resume SDT-related radio bearer, and may initiate an access process for the downlink small data packet.

S203, receiving a downlink small data packet sent by the first base station according to the resumed SDT-related configuration.

In the present embodiment, after the terminal resumes the SDT-related configuration, the first base station may send the downlink small data packet to the terminal, the terminal may receive, according to the resumed SDT-related configuration, the downlink small data packet sent by the first base station, and the specific process thereof needs to be different according to a determination whether the first base station is the anchor base station or the non-anchor base station.

For the case that the first base station is the anchor base station (that is, the terminal responds to paging at the anchor base station), the specific process that the anchor base station sends the downlink small data packet to the terminal is described as follows:

after processing the downlink small data packet, the anchor base station sends the downlink small data packet to the terminal directly according to the terminal context information (including the SDT-related configuration information of the terminal).

For the processing to the downlink small data packet, if the downlink small data packet is non-access stratum (NAS) signaling, the processing may include: packaging the NAS signaling in an RRC message and performing PDCP (Packet Data Convergence Protocol) processing, and then, performing at least one of the following: physical layer processing, MAC (Media Access Control) layer processing, or RLC (Radio link Control) layer processing; and if the downlink small data packet is downlink SDT data, the processing may include: performing SDAP (Service Data Adaptation Protocol) processing and PDCP processing on the downlink SDT data, and then, performing at least one of the following: physical layer processing, MAC layer processing, or RLC layer processing.

In one embodiment, after it is determined by the anchor base station that sending all downlink small data packet is completed, an RRC release message may be generated and sent to the terminal, and the terminal may stop to receive the downlink small data packet according to the RRC release message, and enter an RRC Idle state or continue to keep in the RRC Inactive state (the SDT-related configuration may be released).

In one embodiment, after receiving the downlink small data packet sent by the core network, the anchor base station may further determine whether to transmit the downlink small data packet by adopting the above-mentioned SDT process, for example, it is determined whether the downlink small data packet satisfies the maximum data processing capacity of the anchor base station, if yes, the downlink small data packet is transmitted by adopting the above-mentioned SDT process; and if not, the downlink small data packet is transmitted without adopting the above-mentioned SDT process, an RRC resume message is sent to the terminal, and the terminal resumes full configuration in the RRC Inactive state according to the RRC resume message to resume from the RRC Inactive state to an RRC Connected state to receive data in the RRC Connected state.

For the case that the first base station is the non-anchor base station (that is, the terminal responds to paging at the non-anchor base station), the specific process that the base station sends the downlink small data packet to the terminal is described as follows:

the anchor base station sends preset terminal context information to the non-anchor base station; in addition, after performing first processing on the downlink small data packet, the anchor base station may send the processed downlink small data packet to the non-anchor base station; and the non-anchor base station performs second processing on the downlink small data packet according to the terminal context information, and sends the downlink small data packet subjected to the second processing to the terminal.

The preset terminal context information is the SDT-related configuration information of the terminal; or the preset terminal context information may be full context information of the terminal, where the full context information includes the SDT-related configuration information of the terminal. In one embodiment, the SDT-related configuration information of the terminal at least includes SDT DRB-related RLC configuration.

The downlink small data packet may be subjected to one-part processing (such as high-level processing) by the anchor base station and the-other-part processing (such as low-level processing) by the non-anchor base station. In one embodiment, if the downlink small data packet is non-access stratum (NAS) signaling, the anchor base station may package the NAS signaling in an RRC message and perform PDCP processing, and then, send the NAS signaling to the non-anchor base station to be subjected to at least one of the following: physical layer processing, MAC layer processing, or RLC layer processing; and if the downlink small data packet is downlink SDT data, the anchor base station may perform SDAP processing and PDCP processing on the downlink SDT data, and then, send the downlink SDT data to the non-anchor base station to be subjected to at least one of the following: physical layer processing. MAC layer processing, or RLC layer processing.

In one embodiment, when the anchor base station sends the downlink small data packet to the non-anchor base station, if the downlink small data packet is the downlink SDT data, downlink SDT data forwarding tunnel information, such as Xn data forwarding channel information corresponding to DL SDT DRB, sent by the non-anchor base station may be received, and then, the anchor base station sends the downlink small data packet to the non-anchor base station through a downlink SDT data forwarding tunnel; and if the downlink small data packet is the NAS signaling, the anchor base station may send the processed downlink small data packet to the non-anchor base station through an Xn interface.

In one embodiment, after receiving a response of the terminal to radio paging, the non-anchor base station may send a terminal context information request message to the anchor base station, and the anchor base station sends the terminal context information to the non-anchor base station in response to the terminal context information request message. In one embodiment, the terminal context information request message may carry the maximum SDT data processing capacity of the non-anchor base station, and the anchor base station may determine whether a data volume of the downlink small data packet satisfies the maximum SDT data processing capacity of the non-anchor base station; if yes, it is determined that the downlink small data packet is transmitted by adopting the above-mentioned SDT process, anchor transfer is not performed, and thus, the downlink small data transmission process can be further simplified, and the transmission efficiency is increased; and if not, it is determined that the downlink small data packet is transmitted without adopting the SDT process, anchor transfer and path changing need to be performed, that is, the full context information of the terminal and the downlink small data packet are sent to the non-anchor base station, and the non-anchor base station is converted into a new anchor base station according to the full context information of the terminal, the new anchor base station performs full processing on the downlink small data packet, and then, sends the downlink small data packet to the terminal, and the RRC resume message may be sent to the terminal, and the terminal resumes from the RRC Inactive state to the RRC Connected state to receive data, which ensures that data is stably transmitted.

On the basis of the above-mentioned embodiments, if it is determined by the anchor base station or the non-anchor base station that sending all the downlink small data packet is completed, an RRC release message may be generated, and may be sent to the terminal by the non-anchor base station, and the terminal may stop to receive the downlink small data packet according to the RRC release message, and enter an RRC Idle state or keeps in the RRC Inactive state (the SDT-related configuration may be released).

According to the data transmission method provided in the present embodiment, for a terminal in an RRC Inactive state, an anchor base station initiates radio paging to the terminal and radio paging of a non-anchor base station in an RNA to the terminal, after receiving a downlink small data packet sent by a core network; a radio paging message and an RAN paging message include indication information on downlink small data transmission (SDT); and after receiving the radio paging message, the terminal can resume SDT-related configuration in the RRC Inactive state according to preset SDT-related configuration information, and the anchor base station can send the downlink small data packet to the terminal directly or through the non-anchor base station. According to the data transmission method in the present application, during downlink small data transmission, the terminal keeps in the RRC Inactive state and only resumes the SDT-related configuration, in this way, the downlink small data packet sent by the anchor base station directly or through the non-anchor base station can be received according to the resumed SDT-related configuration, and a downlink small data transmission process is simpler and more efficient.

In order to further introduce the above-mentioned data transmission method, embodiments of the present application further provide following examples for detailed illustration.

Example 1: A Terminal Responds to Paging Under an Anchor Base Station

Figure 3:
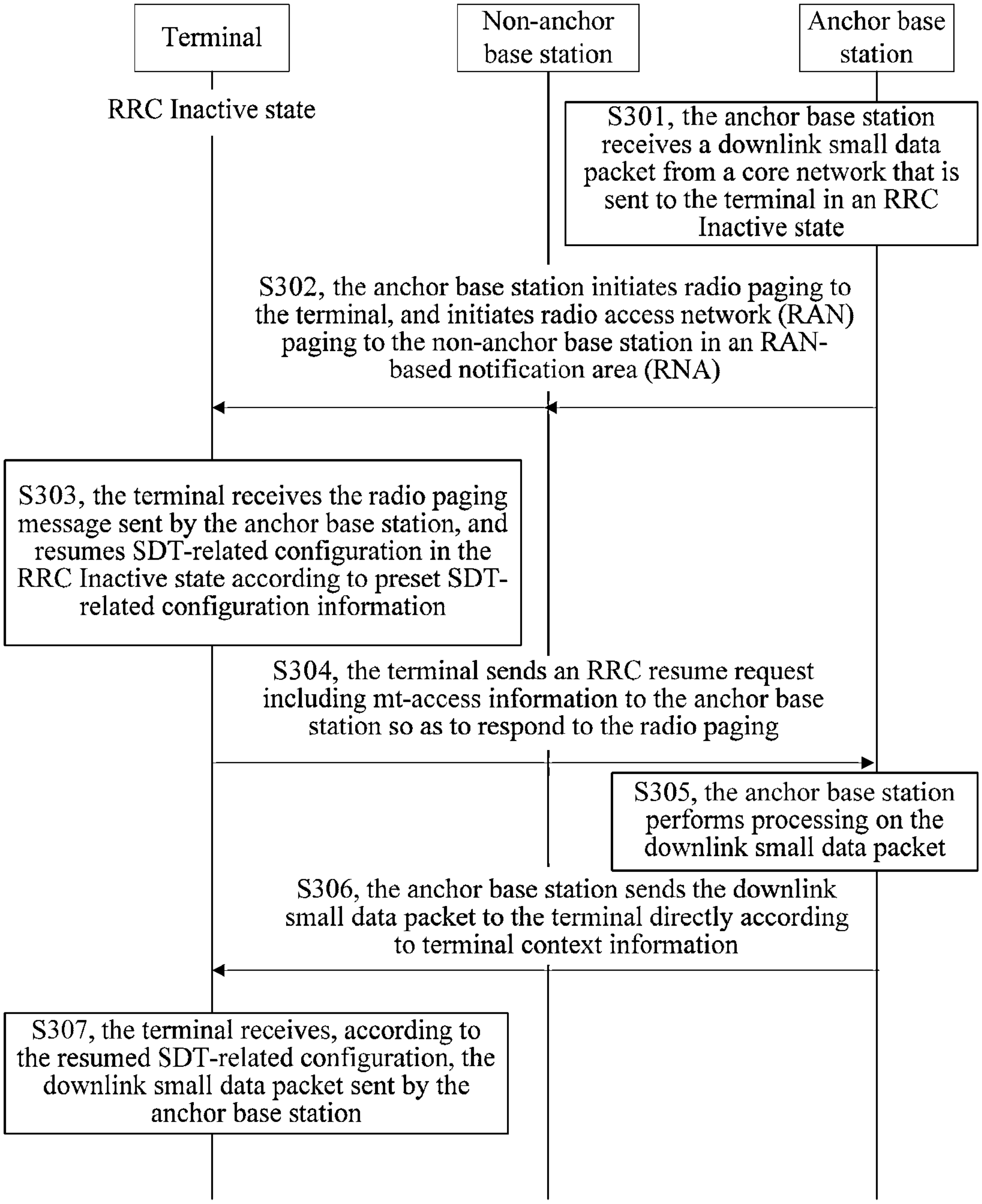
FIG. 3 is a signaling diagram of a data transmission method provided in an embodiment of the present application.

A signaling diagram of a data transmission method provided in the present example is shown in FIG. 3, and the method includes the following specific steps.

S301, the anchor base station receives a downlink small data packet from a core network that is sent to the terminal in an RRC Inactive state.

S302, the anchor base station initiates radio paging to the terminal, and initiates radio access network (RAN) paging to the non-anchor base station in an RAN-based notification area (RNA); a radio paging message and an RAN paging message include indication information on downlink small data transmission (SDT).

S303, the terminal receives the radio paging message sent by the anchor base station, and resumes SDT-related configuration in the RRC Inactive state according to preset SDT-related configuration information.

S304, the terminal sends an RRC resume request including mt-access information to the anchor base station to respond to the radio paging.

S305, the anchor base station performs processing on the downlink small data packet.

If the downlink small data packet is non-access stratum (NAS) signaling, the processing may include: packaging the NAS signaling in an RRC message, performing PDCP processing, and then, performing at least one of the following: physical layer processing, MAC layer processing, or RLC layer processing; and if the downlink small data packet is downlink SDT data, the processing may include: performing SDAP processing and PDCP processing on the downlink SDT data, and then, performing at least one of the following: physical layer processing, MAC layer processing, or RLC layer processing.

S306, the anchor base station sends the downlink small data packet to the terminal directly according to terminal context information.

The terminal context information includes SDT-related configuration information of the terminal.

S307, the terminal receives, according to the resumed SDT-related configuration, the downlink small data packet sent by the anchor base station.

Example 2: A Terminal Responds to Paging Under a Non-Anchor Base Station, and an Anchor Base Station Decides to Transmit a Downlink Small Data Packet by Adopting an SDT Process (Anchor Transfer is not Performed)

Figure 4:
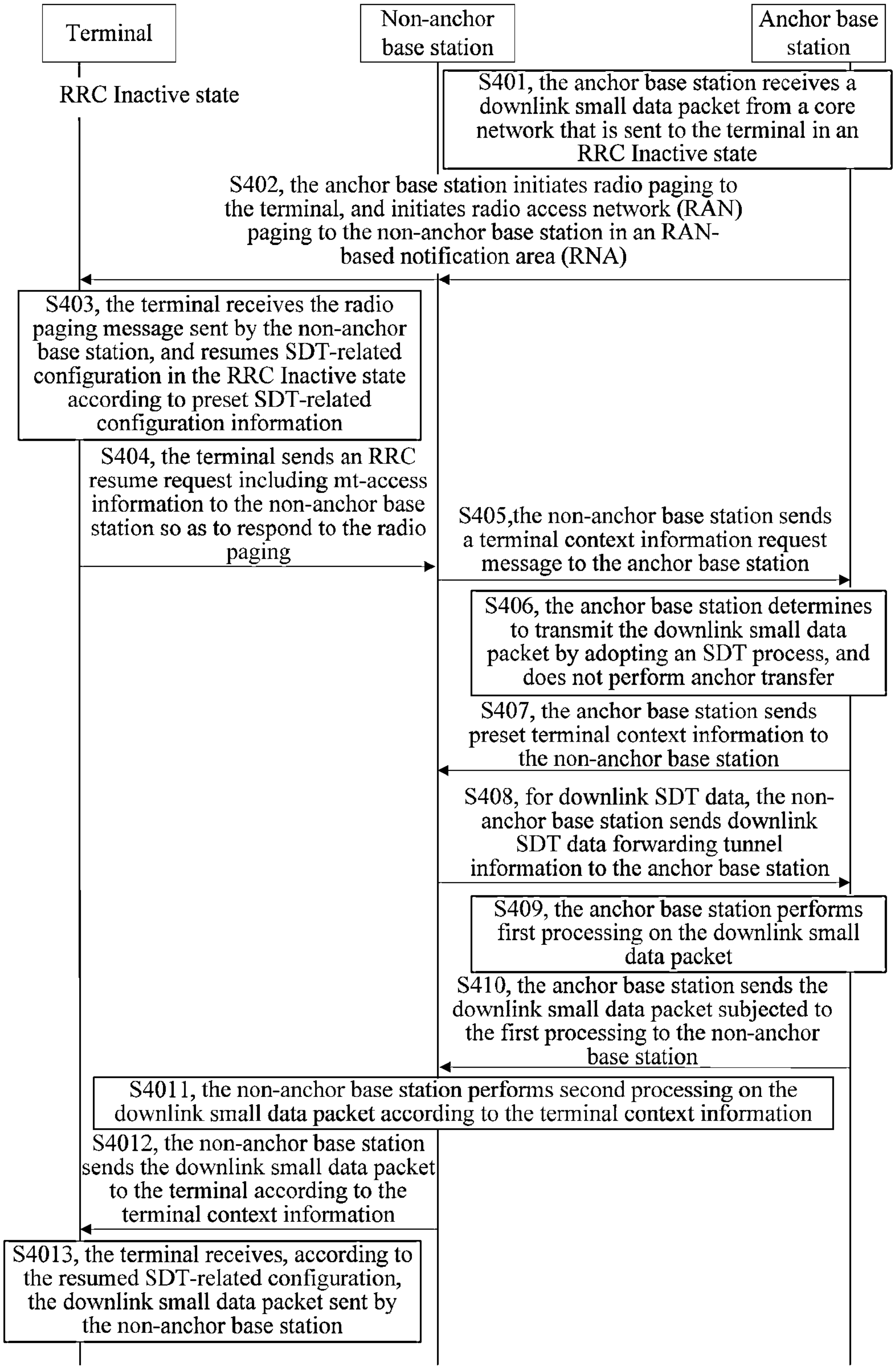
FIG. 4 is a signaling diagram of a data transmission method provided in another embodiment of the present application.

A signaling diagram of a data transmission method provided in the present example is shown in FIG. 4, and the method includes the following specific steps.

S401, the anchor base station receives a downlink small data packet from a core network that is sent to the terminal in an RRC Inactive state.

S402, the anchor base station initiates radio paging to the terminal, and initiates radio access network (RAN) paging to the non-anchor base station in an RAN-based notification area (RNA); a radio paging message and an RAN paging message include indication information on downlink small data transmission (SDT).

S403, the terminal receives the radio paging message sent by the non-anchor base station, and resumes SDT-related configuration in the RRC Inactive state according to preset SDT-related configuration information.

S404, the terminal sends an RRC resume request including mt-access information to the non-anchor base station to respond to the radio paging.

S405, the non-anchor base station sends a terminal context information request message to the anchor base station.

The terminal context information request message may carry the maximum SDT data processing capacity of the non-anchor base station, and it is determined, by the anchor base station, whether a data volume of the downlink small data packet satisfies the maximum SDT data processing capacity of the non-anchor base station.

S406, the anchor base station determines to transmit the downlink small data packet by adopting an SDT process, and does not perform anchor transfer.

The anchor base station determines that the data volume of the downlink small data packet satisfies the maximum SDT data processing capacity of the non-anchor base station, and determines to transmit the downlink small data packet by adopting the above-mentioned SDT process, and does not perform anchor transfer.

S407, the anchor base station sends preset terminal context information to the non-anchor base station.

The preset terminal context information is the SDT-related configuration information of the terminal; or the preset terminal context information may be full context information of the terminal, where the full context information includes the SDT-related configuration information of the terminal. In one embodiment, the SDT-related configuration information of the terminal at least includes SDT DRB-related RLC configuration.

S408, for downlink SDT data, the non-anchor base station sends downlink SDT data forwarding tunnel information to the anchor base station.

Of course, for downlink NAS signaling, it is unnecessary for the non-anchor base station to allocate an SDT data forwarding tunnel and to send the downlink SDT data forwarding tunnel information to the anchor base station.

S409, the anchor base station performs first processing on the downlink small data packet.

If the downlink small data packet is downlink SDT data, the processing may include: performing SDAP processing and PDCP processing on the downlink SDT data; and if the downlink small data packet is non-access stratum (NAS) signaling, the processing may include: packaging the NAS signaling in an RRC message, and performing PDCP processing.

S410, the anchor base station sends the downlink small data packet subjected to the first processing to the non-anchor base station.

If the downlink small data packet is the downlink SDT data, the anchor base station sends the downlink small data packet to the non-anchor base station through a downlink SDT data forwarding tunnel allocated by the non-anchor base station; if the downlink small data packet is the NAS signaling, the anchor base station may send the processed downlink small data packet to the non-anchor base station through an Xn interface.

S4011, the non-anchor base station performs second processing on the downlink small data packet according to the terminal context information.

The second processing may include at least one of the flowing: physical layer processing, MAC layer processing, or RLC layer processing;

S4012, the non-anchor base station sends the downlink small data packet to the terminal according to the terminal context information.

S4013, the terminal receives, according to the resumed SDT-related configuration, the downlink small data packet sent by the non-anchor base station.

Example 3: A Terminal Responds to Paging Under a Non-Anchor Base Station, and an Anchor Base Station Decides to Perform Normal Prior Data Transmission (Anchor Transfer is Performed)

Figure 5:
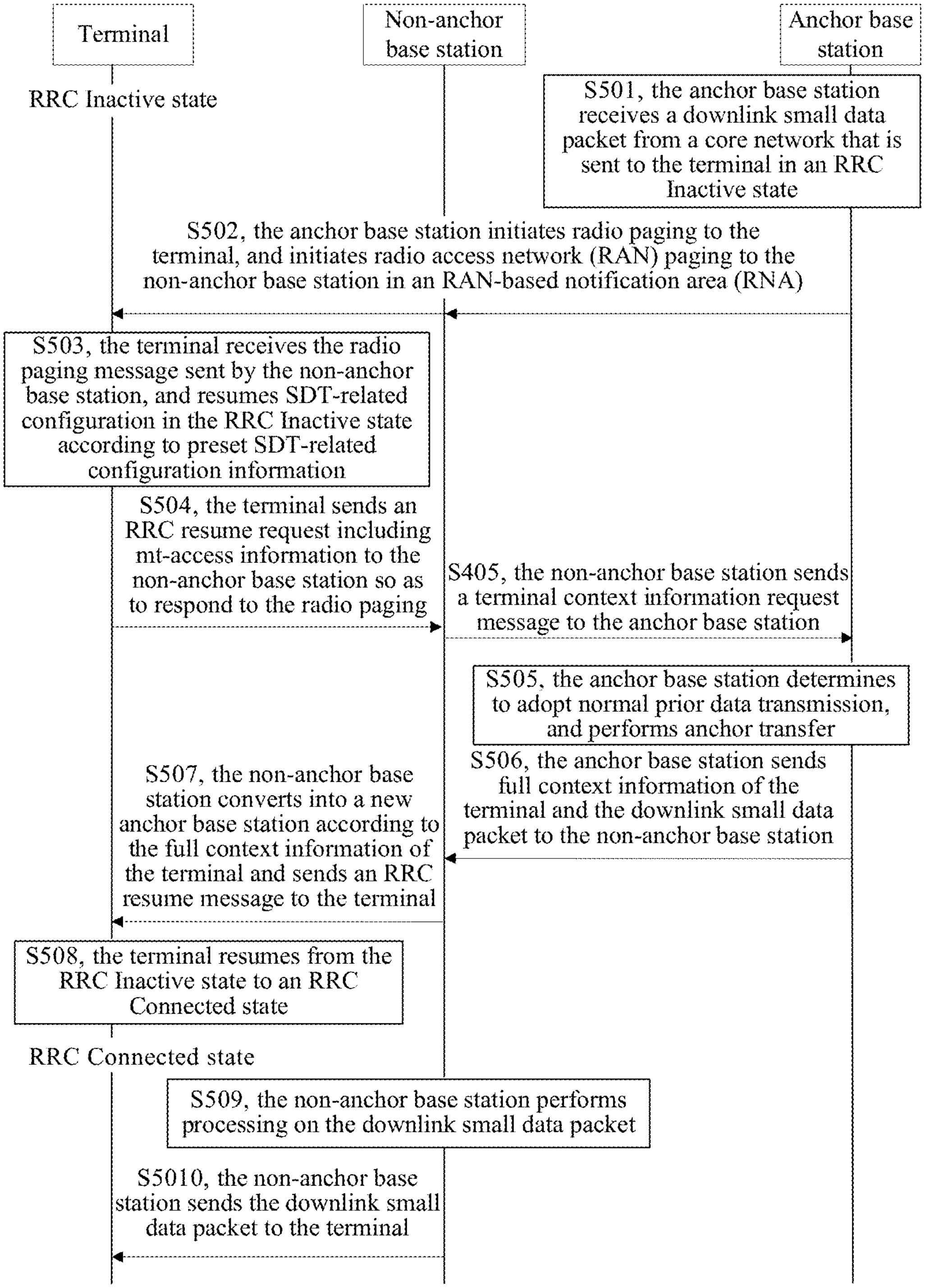
FIG. 5 is a signaling diagram of a data transmission method provided in another embodiment of the present application.

A signaling diagram of a data transmission method provided in the present example is shown in FIG. 5, and the method includes the following specific steps.

S501, the anchor base station receives a downlink small data packet from a core network that is sent to the terminal in an RRC Inactive state.

S502, the anchor base station initiates radio paging to the terminal, and initiates radio access network (RAN) paging to the non-anchor base station in an RAN-based notification area (RNA); a radio paging message and an RAN paging message include indication information on downlink small data transmission (SDT).

S503, the terminal receives the radio paging message sent by the non-anchor base station, and resumes SDT-related configuration in the RRC Inactive state according to preset SDT-related configuration information.

S504, the terminal sends an RRC resume request including mt-access information to the non-anchor base station to respond to the radio paging.

S405, the non-anchor base station sends a terminal context information request message to the anchor base station.

The terminal context information request message may carry the maximum SDT data processing capacity of the non-anchor base station, and it is determined, by the anchor base station, whether a data volume of the downlink small data packet satisfies the maximum SDT data processing capacity of the non-anchor base station.

S505, the anchor base station determines to adopt normal prior data transmission, and performs anchor transfer.

The anchor base station determines that the data volume of the downlink small data packet does not satisfy the maximum SDT data processing capacity of the non-anchor base station, and determines to perform the normal prior data transmission, and performs anchor transfer.

S506, the anchor base station sends full context information of the terminal and the downlink small data packet to the non-anchor base station.

S507, the non-anchor base station converts into a new anchor base station according to the full context information of the terminal and sends an RRC resume message to the terminal.

S508, the terminal resumes from the RRC Inactive state to an RRC Connected state.

S509, the non-anchor base station performs processing on the downlink small data packet.

If the downlink small data packet is non-access stratum (NAS) signaling, the processing may include: packaging the NAS signaling in an RRC message, performing PDCP processing, and then, performing at least one of the following: physical layer processing, MAC layer processing, or RLC layer processing; and if the downlink small data packet is downlink SDT data, the processing may include: performing SDAP processing and PDCP processing on the downlink SDT data, and then, performing at least one of the following: physical layer processing, MAC layer processing, or RLC layer processing.

S5010, the non-anchor base station sends the downlink small data packet to the terminal.

It should be noted that the above-mentioned examples are only some embodiments, are not intended to limit an order of all the steps, and all the steps may be subjected to adjustment including the adjustment of an execution order, the addition, deletion and emendation of the steps, etc. within a reasonable range.

Figure 6:
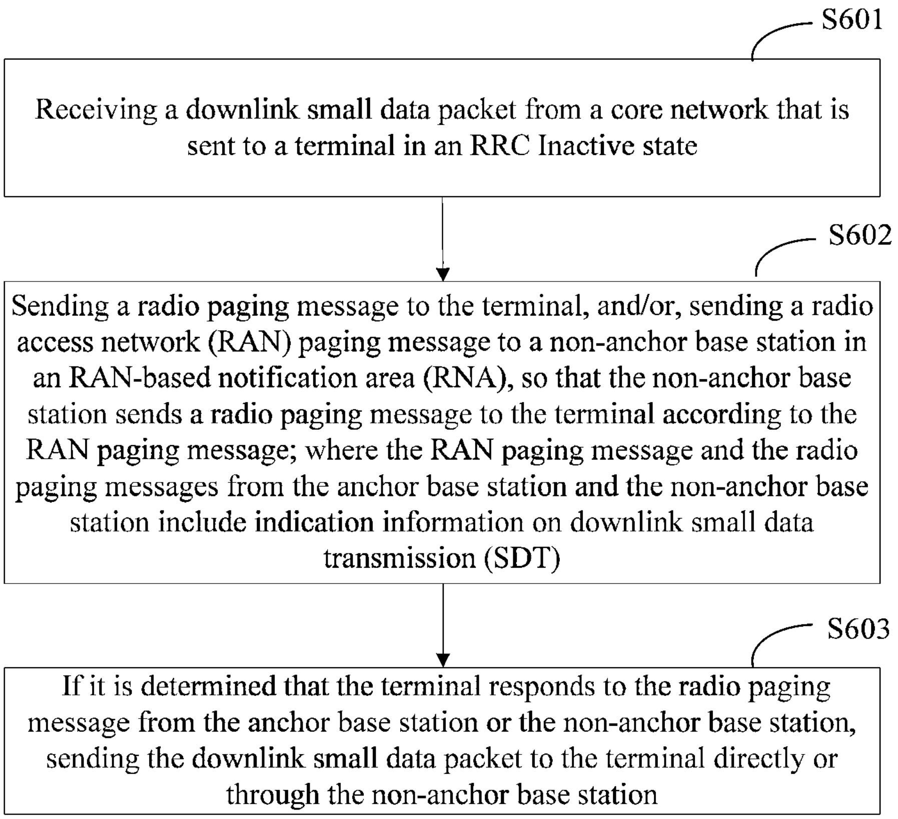
FIG. 6 is a flow diagram of a data transmission method provided in another embodiment of the present application.

FIG. 6 is a flow diagram of a data transmission method provided in the present embodiment. As shown in FIG. 6, the present embodiment provides a data transmission method of which an executive subject is an anchor base station, and the method includes the following specific steps.

S601, receiving a downlink small data packet from a core network that is sent to a terminal in an RRC Inactive state.

S602, sending a radio paging message to the terminal, and/or, sending a radio access network (RAN) paging message to a non-anchor base station in an RAN-based notification area (RNA), and the non-anchor base station sends a radio paging message to the terminal according to the RAN paging message; where the RAN paging message and the radio paging messages from the anchor base station and the non-anchor base station include indication information on downlink small data transmission (SDT).

S603, if it is determined that the terminal responds to the radio paging message from the anchor base station or the non-anchor base station, sending the downlink small data packet to the terminal directly or through the non-anchor base station.

In an embodiment, the sending the downlink small data packet to the terminal directly in S603 includes:

if it is determined that the terminal responds to the radio paging message from the anchor base station, performing first processing and second processing on the downlink small data packet, and then, sending the downlink small data packet subjected to the first processing and the second processing to the terminal.

In another embodiment, the sending the downlink small data packet to the terminal through the non-anchor base station in S603 includes:

if it is determined that the terminal responds to the radio paging message from the non-anchor base station, sending terminal context information of the terminal to the non-anchor base station; and after performing first processing on the downlink small data packet, sending the processed downlink small data packet to the non-anchor base station, and the non-anchor base station performs second processing on the received processed downlink small data packet according to the terminal context information, and sends the downlink small data packet subjected to the second processing to the terminal.

Further, the sending the terminal context information of the terminal to the non-anchor base station includes:

receiving a terminal context information request message sent by the non-anchor base station; and sending the terminal context information of the terminal to the non-anchor base station in response to the terminal context information request message.

On the basis of the above-mentioned embodiments, the terminal context information request message includes the maximum SDT data processing capacity of the non-anchor base station; and the sending the terminal context information of the terminal to the non-anchor base station in response to the terminal context information request message includes:

if it is determined that a data volume of the downlink small data packet satisfies the maximum data processing capacity of the non-anchor base station, determining that the downlink small data packet is transmitted by adopting an SDT process, and sending the terminal context information of the terminal to the non-anchor base station.

On the basis of any one of the above-mentioned embodiments, the terminal context information is SDT-related configuration information of the terminal; or the terminal context information is full context information of the terminal, where the full context information includes the SDT-related configuration information of the terminal.

In an embodiment, if it is determined that the data volume of the downlink small data packet does not satisfy the maximum data processing capacity of the non-anchor base station, it is determined that the downlink small data packet is transmitted without adopting the SDT process, and full terminal context information of the terminal and the downlink small data packet are sent to the non-anchor base station to perform anchor transfer, that is, the non-anchor base station is converted into a new anchor base station according to the full terminal context information of the terminal to perform first processing and second processing on the downlink small data packet, and then, send the downlink small data packet subjected to the first processing and the second processing to the terminal.

In one embodiment, the second processing in each of the above-mentioned embodiments includes at least one of the following: physical layer processing, media access control (MAC) layer processing, or radio link control (RLC) layer processing;

if the downlink small data packet is non-access stratum (NAS) signaling, the first processing includes: packaging the NAS signaling in an RRC message, and performing packet data convergence protocol (PDCP) processing; or, if the downlink small data packet is downlink SDT data, the first processing includes: performing service data adaptation protocol (SDAP) processing and PDCP processing on the downlink SDT data.

On the basis of any one of the above-mentioned embodiments, the sending the processed downlink small data packet to the non-anchor base station includes:

if the downlink small data packet is the downlink SDT data, sending the processed downlink small data packet to the non-anchor base station through a downlink SDT data forwarding tunnel allocated by the non-anchor base station; or if the downlink small data packet is the NAS signaling, sending the processed downlink small data packet to the non-anchor base station through an Xn interface.

On the basis of any one of the above-mentioned embodiments, after it is determined that sending the downlink small data packet is completed, an RRC release message is generated, and is transmitted to the terminal, and the terminal stops to receive the downlink small data packet according to the RRC release message, and enters an RRC Idle state or keeps in the RRC Inactive state.

The data transmission method provided in the present embodiment is the method for an anchor base station side in the above-mentioned embodiment, and is based on the same application concept. Since problem solving principles in the method and the device are similar, repetitions thereof will be no longer repeated.

Figure 7:
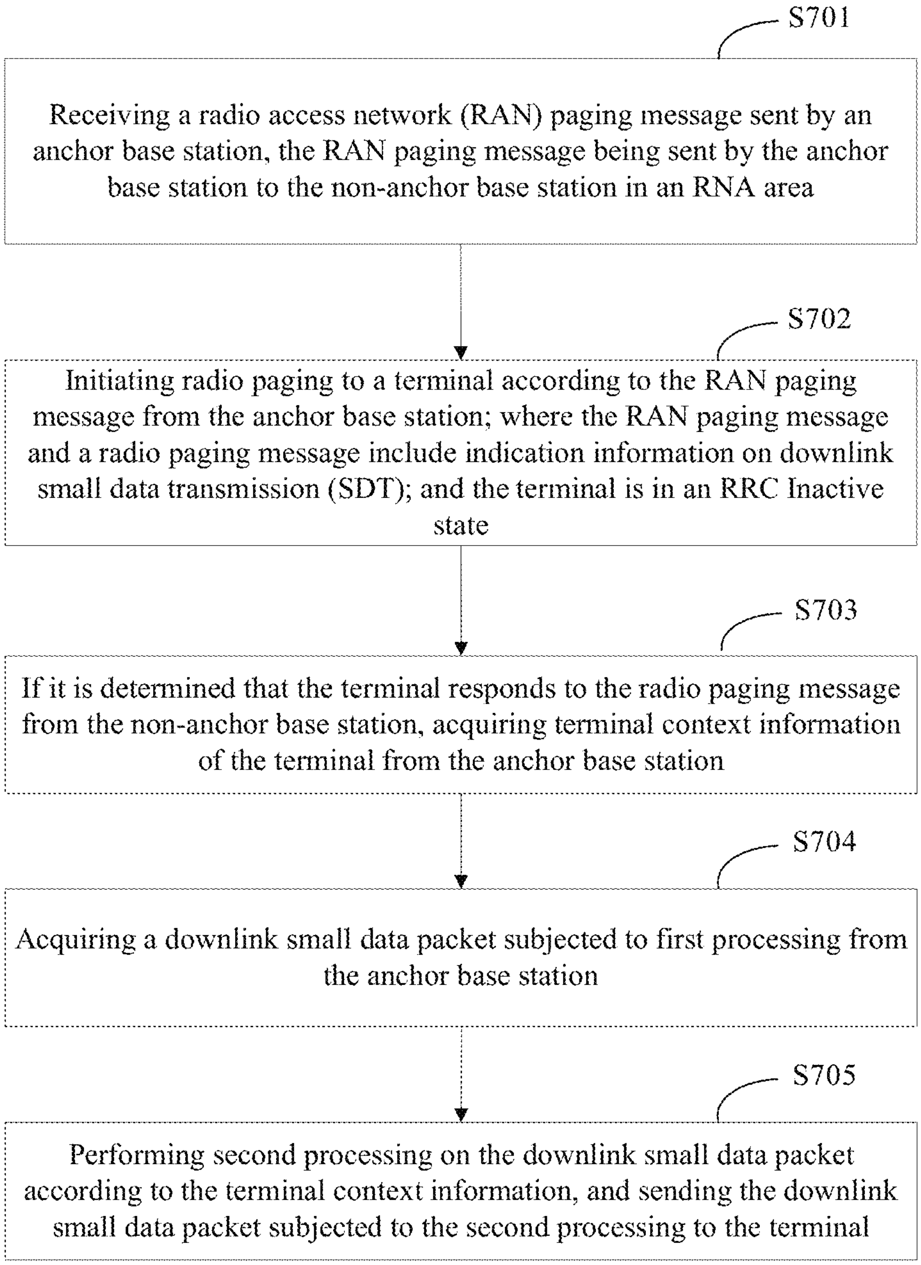
FIG. 7 is a flow diagram of a data transmission method provided in another embodiment of the present application.

FIG. 7 is a flow diagram of a data transmission method provided in the present embodiment. As shown in FIG. 7, the present embodiment provides a data transmission method of which an executive subject is a non-anchor base station, and the method includes the following specific steps.

S701, receiving a radio access network (RAN) paging message sent by an anchor base station, the RAN paging message being sent by the anchor base station to the non-anchor base station in an RNA.

S702, initiating radio paging to a terminal according to the RAN paging message from the anchor base station; where the RAN paging message and a radio paging message include indication information on downlink small data transmission (SDT); and the terminal is in an RRC Inactive state.

S703, if it is determined that the terminal responds to the radio paging message from the non-anchor base station, acquiring terminal context information of the terminal from the anchor base station.

S704, acquiring a downlink small data packet subjected to first processing from the anchor base station.

S705, performing second processing on the downlink small data packet according to the terminal context information, and sending the downlink small data packet subjected to the second processing to the terminal.

In one embodiment, the acquiring the terminal context information of the terminal from the anchor base station in S703 includes:

sending a terminal context information request message to the anchor base station; and receiving the terminal context information of the terminal that is sent by the anchor base station according to the terminal context information request message.

In one embodiment, the terminal context information request message includes the maximum data processing capacity of the non-anchor base station; and further, the receiving the terminal context information of the terminal that is sent by the anchor base station according to the terminal context information request message includes:

receiving the terminal context information of the terminal that is sent by the anchor base station after it is determined that the data volume of the downlink small data packet satisfies the maximum data processing capacity of the non-anchor base station.

In an embodiment, after sending the terminal context information request message to the anchor base station, the method further includes:

receiving full context information of the terminal and the downlink small data packet that are sent by the anchor base station after it is determined that the data volume of the downlink small data packet does not satisfy the maximum data processing capacity of the non-anchor base station;

converting into a new anchor base station according to the full context information of the terminal, and sending an RRC resume message to the terminal, and the terminal resumes from the RRC Inactive state to an RRC Connected state; and performing first processing and second processing on the downlink small data packet according to the full context information of the terminal, and then, sending the downlink small data packet subjected the first processing and the second processing to the terminal.

On the basis of the above-mentioned embodiments, the acquiring the downlink small data packet subjected to the first processing from the anchor base station includes:

if the downlink small data packet is downlink SDT data, allocating a downlink SDT data forwarding tunnel to the downlink SDT data, and sending downlink SDT data forwarding tunnel information to the anchor base station;

receiving the downlink small data packet subjected to the first processing sent by the anchor base station through the downlink SDT data forwarding tunnel; or if the downlink small data packet is NAS signaling, receiving the downlink small data packet subjected to the first processing sent by the anchor base station through an Xn interface.

The data transmission method provided in the present embodiment is the method for a non-anchor base station side in the above-mentioned embodiment, and is based on the same application concept. Since problem solving principles in the method and the device are similar, repetitions thereof will be no longer repeated.

Figure 8:
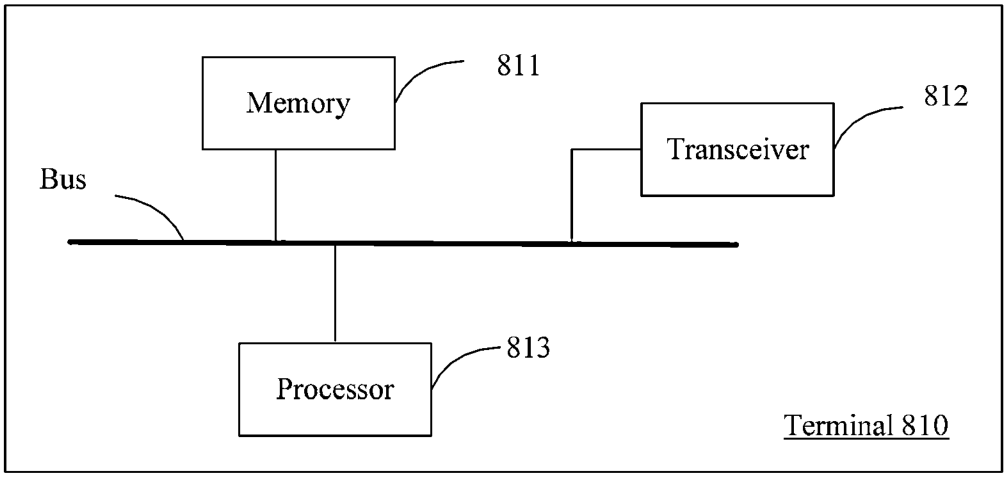
FIG. 8 is a structural diagram of a terminal provided in an embodiment of the present application.

FIG. 8 is a structural diagram of a terminal provided in an embodiment of the present application. The terminal provided in the present embodiment may perform a processing flow provided in a method embodiment for a terminal side. As shown in FIG. 8, the terminal 810 includes a memory 811, a transceiver 812, and a processor 813.

In FIG. 8, the bus architecture may include any number of buses and bridges interconnected with each other, and may be configured to link various circuits of one or more processors represented by the processor 813 and a memory represented by the memory 811. The bus architecture is also capable of linking various other circuits such as peripheral equipment, a voltage stabilizer and a power management circuit together. Therefore, the further description of the bus architecture is omitted herein. A bus interface is provided with an interface. The transceiver 812 may be multiple elements, i.e., include a transmitter and a receiver, providing units for communication with various other devices on the transmission media, and these transmission media include a wireless channel, a wired channel, an optical cable, etc. The processor 813 takes charge of managing the bus architecture and general processing, and the memory 811 is capable of storing data used when the processor 813 performs an operation.

The processor 813 may be a central processing unit (CPU), an Application Specific Integrated Circuit (ASIC), a Field-Programmable Gate Array (FPGA) or a Complex Programmable Logic Device (CPLD), and the processor may also adopt a multi-core architecture.

The memory 811 is configured to store a computer program; the transceiver 812 is configured to transceive data under control of the processor 813; and the processor 813 is configured to read the computer program in the memory 811 and perform the following operations:

receiving a radio paging message from a first base station to the terminal, where the radio paging message includes indication information on downlink small data transmission (SDT); the terminal is in a radio resource control (RRC) inactive (Inactive) state; and the first base station is an anchor base station or a non-anchor base station;

resuming SDT-related configuration in the RRC Inactive state according to the indication information on the downlink SDT included in the radio paging message; and receiving, according to the resumed SDT-related configuration, a downlink small data packet sent by the first base station.

On the basis of any one of the above-mentioned embodiments, when resuming the SDT-related configuration in the RRC Inactive state according to preset SDT-related configuration information, the processor 813 is configured to:

resume SDT-related radio bearer configuration according to preset SDT-related radio bearer configuration information, and send an RRC resume request message to the first base station to request the first base station to resume SDT-related radio bearer.

On the basis of any one of the above-mentioned embodiments, the preset SDT-related configuration information includes SDT configuration information provided by the anchor base station when the terminal enters the RRC Inactive state, or includes preset default SDT configuration information.

On the basis of any one of the above-mentioned embodiments, the downlink small data packet includes downlink SDT data or non-access stratum (NAS) signaling.

On the basis of any one of the above-mentioned embodiments, after resuming the SDT-related configuration in the RRC Inactive state, the processor 813 is further configured to:

receive an RRC resume message sent by the first base station; and resume the terminal from the RRC Inactive state to an RRC connected (Connected) state according to the RRC resume message.

On the basis of any one of the above-mentioned embodiments, after resuming the SDT-related configuration in the RRC Inactive state, the processor 813 is further configured to:

receive an RRC release message sent by the first base station; and stop to receive the SDT downlink small data packet according to the RRC release message, and enter an RRC idle (Idle) state or keep in the RRC Inactive state.

The terminal provided in the embodiment of the present application may be configured to perform the method embodiment for the above-mentioned terminal side, and the specific functions thereof will not be repeated herein.

Figure 9:
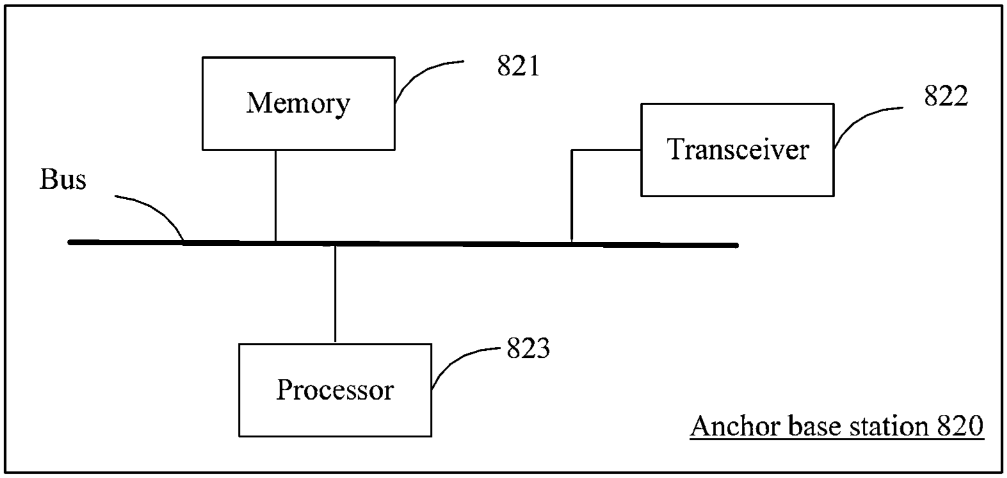
FIG. 9 is a structural diagram of an anchor base station provided in an embodiment of the present application.

FIG. 9 is a structural diagram of an anchor base station provided in an embodiment of the present application. The base station provided in the present embodiment may perform a processing flow provided in a method embodiment for a base station side. As shown in FIG. 9, the base station 820 includes a memory 821, a transceiver 822, and a processor 823.

In FIG. 9, the bus architecture may include any number of buses and bridges interconnected with each other, and may be configured to link various circuits of one or more processors represented by the processor 823 and a memory represented by the memory 821. The bus architecture is also capable of linking various other circuits such as peripheral equipment, a voltage stabilizer and a power management circuit together. Therefore, the further description of the bus architecture is omitted herein. A bus interface is provided with an interface. The transceiver 822 may be multiple elements, i.e., include a transmitter and a receiver, providing units for communication with various other devices on the transmission media, and these transmission media include a wireless channel, a wired channel, an optical cable, etc. The processor 823 takes charge of managing the bus architecture and general processing, and the memory 821 is capable of storing data used when the processor 823 performs an operation.

The processor 823 may be a central processing unit (CPU), an Application Specific Integrated Circuit (ASIC), a Field-Programmable Gate Array (FPGA) or a Complex Programmable Logic Device (CPLD), and the processor may also adopt a multi-core architecture.

The memory 821 is configured to store a computer program; the transceiver 822 is configured to transceive data under control of the processor 823; and the processor 823 is configured to read the computer program in the memory 821 and perform the following operations:

receiving a downlink small data packet from a core network that is to be sent to a terminal in an RRC Inactive state;

sending a radio paging message to the terminal, and/or, sending a radio access network (RAN) paging message to a non-anchor base station in an RAN-based notification area (RNA), and the non-anchor base station sends a radio paging message to the terminal according to the RAN paging message; where the RAN paging message and the radio paging messages from the anchor base station and the non-anchor base station include indication information on downlink small data transmission (SDT); and if it is determined that the terminal responds to the radio paging message from the anchor base station or the non-anchor base station, sending the downlink small data packet to the terminal directly or through the non-anchor base station.

On the basis of any one of the above-mentioned embodiments, when sending the downlink small data packet to the terminal through the non-anchor base station, the processor 823 is configured to:

if it is determined that the terminal responds to the radio paging message from the non-anchor base station, send terminal context information of the terminal to the non-anchor base station; and after performing first processing on the downlink small data packet, send the processed downlink small data packet to the non-anchor base station, and the non-anchor base station performs second processing on the received processed downlink small data packet according to the terminal context information, and sends the downlink small data packet subjected to the second processing to the terminal.

On the basis of any one of the above-mentioned embodiments, when sending the downlink small data packet to the terminal directly, the processor 823 is configured to:

if it is determined that the terminal responds to the radio paging message from the anchor base station, perform first processing and second processing on the downlink small data packet, and then, send the downlink small data packet subjected to the first processing and the second processing to the terminal.

On the basis of any one of the above-mentioned embodiments, when sending the terminal context information of the terminal to the non-anchor base station, the processor 823 is configured to:

receive a terminal context information request message sent by the non-anchor base station; and send the terminal context information to the non-anchor base station in response to the terminal context information request message.

On the basis of any one of the above-mentioned embodiments, the terminal context information request message includes the maximum SDT data processing capacity of the non-anchor base station; and when sending the terminal context information to the non-anchor base station in response to the terminal context information request message, the processor 823 is configured to:

if it is determined that a data volume of the downlink small data packet satisfies the maximum data processing capacity of the non-anchor base station, determine that the downlink small data packet is transmitted by adopting an SDT process, and send the context information of the terminal to the non-anchor base station.

On the basis of any one of the above-mentioned embodiments, the terminal context information is SDT-related configuration information of the terminal; or the terminal context information is full context information of the terminal, where the full context information includes the SDT-related configuration information of the terminal.

On the basis of any one of the above-mentioned embodiments, the processor 823 is further configured to:

if it is determined that the data volume of the downlink small data packet does not satisfy the maximum data processing capacity of the non-anchor base station, determine that the downlink small data packet is transmitted without adopting the SDT process, and send full terminal context information of the terminal and the downlink small data packet to the non-anchor base station to perform anchor transfer, that is, the non-anchor base station is converted into a new anchor base station according to the full terminal context information of the terminal to perform first processing and second processing on the downlink small data packet, and then, send the downlink small data packet subjected to the first processing and the second processing to the terminal.

On the basis of any one of the above-mentioned embodiments, the second processing includes at least one of the following: physical layer processing, media access control (MAC) layer processing, or radio link control (RLC) layer processing:

if the downlink small data packet is non-access stratum (NAS) signaling, the first processing includes: packaging the NAS signaling in an RRC message, and performing packet data convergence protocol (PDCP) processing; or, if the downlink small data packet is downlink SDT data, the first processing includes: performing service data adaptation protocol (SDAP) processing and PDCP processing on the downlink SDT data.

On the basis of any one of the above-mentioned embodiments, when sending the processed downlink small data packet to the non-anchor base station, the processor 823 is configured to:

if the downlink small data packet is downlink SDT data, receive downlink SDT data forwarding tunnel information sent by the non-anchor base station;

send the processed downlink small data packet to the non-anchor base station through a downlink SDT data forwarding tunnel; or if the downlink small data packet is NAS signaling, send the processed downlink small data packet to the non-anchor base station through an Xn interface.

On the basis of any one of the above-mentioned embodiments, the processor 823 is further configured to:

after it is determined that sending the downlink small data packet is completed, generate an RRC release message, and transmit the RRC release message to the terminal, and the terminal stops to receive the downlink small data packet according to the RRC release message, and enters an RRC Idle state or keeps in the RRC Inactive state.

The anchor base station provided in the embodiment of the present application may be configured to perform the method embodiment for the above-mentioned anchor base station side, and the specific functions thereof will not be repeated herein.

Figure 10:
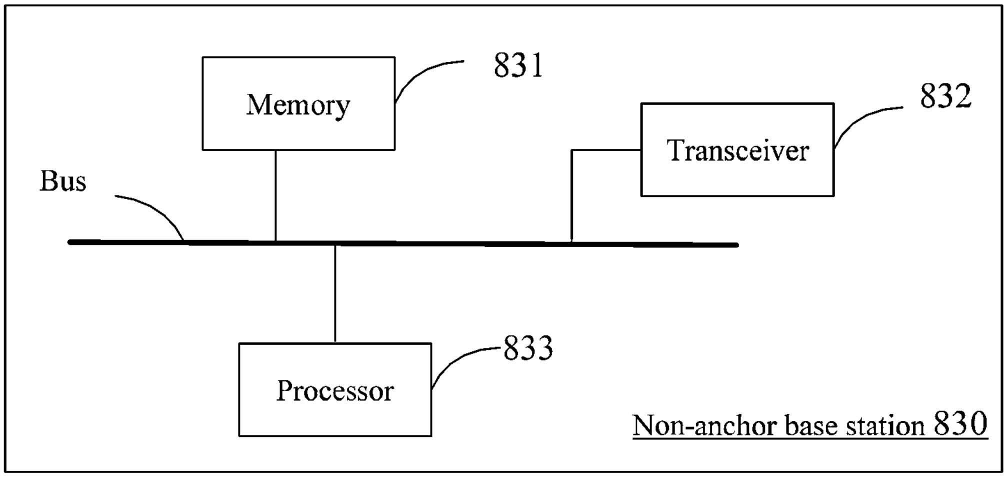
FIG. 10 is a structural diagram of a non-anchor base station provided in an embodiment of the present application.

FIG. 10 is a structural diagram of a non-anchor base station provided in an embodiment of the present application. The non-anchor base station provided in the present embodiment may perform the processing flow provided in the method embodiment for the non-anchor base station side. As shown in FIG. 9, the non-anchor base station 830 includes a memory 831, a transceiver 832, and a processor 833.

In FIG. 10, the bus architecture may include any number of buses and bridges interconnected with each other, and may be configured to link various circuits of one or more processors represented by the processor 833 and a memory represented by the memory 831 together. The bus architecture is also capable of linking various other circuits such as peripheral equipment, a voltage stabilizer and a power management circuit together. Therefore, the further description of the bus architecture is omitted herein. A bus interface is provided with an interface. The transceiver 832 may be a number of elements, i.e., include a transmitter and a receiver, providing units for communication with various other devices on the transmission media, and these transmission media include a wireless channel, a wired channel, an optical cable, etc. The processor 833 takes charge of managing the bus architecture and general processing, and the memory 831 is capable of storing data used when the processor 833 performs an operation.

The processor 833 may be a central processing unit (CPU), an Application Specific Integrated Circuit (ASIC), a Field-Programmable Gate Array (FPGA) or a Complex Programmable Logic Device (CPLD), and the processor may also adopt a multi-core architecture.

The memory 831 is configured to store a computer program; the transceiver 832 is configured to transceive data under control of the processor 833; and the processor 833 is configured to read the computer program in the memory 831 and perform the following operations:

receiving a radio access network (RAN) paging message sent by an anchor base station, the RAN paging message being sent by the anchor base station to the non-anchor base station in an RNA;

initiating radio paging to a terminal according to the RAN paging message from the anchor base station; where the RAN paging message and a radio paging message include indication information on downlink small data transmission (SDT); and the terminal is in an RRC Inactive state;

if it is determined that the terminal responds to the radio paging message from the non-anchor base station, acquiring terminal context information of the terminal from the anchor base station;

acquiring a downlink small data packet subjected to first processing from the anchor base station; and performing second processing on the downlink small data packet according to the terminal context information, and sending the downlink small data packet subjected to the second processing to the terminal.

On the basis of any one of the above-mentioned embodiments, when acquiring the terminal context information of the terminal from the anchor base station, the processor 833 is configured to:

send a terminal context information request message to the anchor base station; and receive the terminal context information of the terminal that is sent by the anchor base station according to the terminal context information request message.

On the basis of any one of the above-mentioned embodiments, the terminal context information request message includes a maximum data processing capacity of the non-anchor base station; and when receiving the terminal context information of the terminal that is sent by the anchor base station according to the terminal context information request message, the processor 833 is configured to:

receive the terminal context information of the terminal that is sent by the anchor base station after it is determined that a data volume of the downlink small data packet satisfies the maximum data processing capacity of the non-anchor base station.

On the basis of any one of the above-mentioned embodiments, after sending the terminal context information request message to the anchor base station, the processor 833 is further configured to:

receive full context information of the terminal and the downlink small data packet that are sent by the anchor base station after it is determined that the a data volume of the downlink small data packet does not satisfy a maximum data processing capacity of the non-anchor base station;

convert into a new anchor base station according to the full context information of the terminal, and send an RRC resume message to the terminal, and the terminal resumes from the RRC Inactive state to an RRC Connected state; and perform first processing and second processing on the downlink small data packet according to the full context information of the terminal, and then, send the downlink small data packet subjected to the first processing and the second processing to the terminal.

On the basis of any one of the above-mentioned embodiments, when acquiring the downlink small data packet subjected to the first processing from the anchor base station, the processor 833 is configured to:

if the downlink small data packet is downlink SDT data, allocate a downlink SDT data forwarding tunnel to the downlink SDT data, and send downlink SDT data forwarding tunnel information to the anchor base station;

receive the downlink small data packet subjected to the first processing sent by the anchor base station through the downlink SDT data forwarding tunnel; or if the downlink small data packet is NAS signaling, receive the downlink small data packet subjected to the first processing sent by the anchor base station through an Xn interface.

The non-anchor base station provided in the embodiment of the present application may be configured to perform the method embodiment for the above-mentioned non-anchor base station side, and the specific functions thereof will not be repeated herein.

Figure 11:
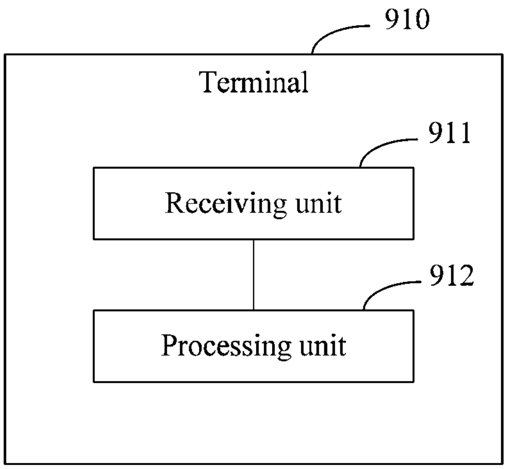
FIG. 11 is a structural diagram of a terminal provided in another embodiment of the present application.

FIG. 11 is a structural diagram of a terminal provided in an embodiment of the present application. The terminal provided in the present embodiment may perform the processing flow provided in the method embodiment for the terminal side. As shown in FIG. 11, the terminal 910 includes a receiving unit 911 and a processing unit 912.

The receiving unit 911 is configured to receive a radio paging message from a first base station to the terminal, where the radio paging message includes indication information on downlink small data transmission (SDT), the terminal is in a radio resource control (RRC) inactive (Inactive) state, and the first base station is an anchor base station or a non-anchor base station; and the processing unit 912 is configured to resume SDT-related configuration in the RRC Inactive state according to the indication information on the downlink SDT included in the radio paging message;

where the receiving unit 911 is further configured to receive, according to the resumed SDT-related configuration, a downlink small data packet sent by the first base station.

On the basis of any one of the above-mentioned embodiments, when resuming the SDT-related configuration in the RRC Inactive state according to preset SDT-related configuration information, the processing unit 912 is configured to:

resume SDT-related radio bearer configuration according to preset SDT-related radio bearer configuration information, and send an RRC resume request message to the first base station to request the first base station to resume SDT-related radio bearer.

On the basis of any one of the above-mentioned embodiments, the preset SDT-related configuration information includes SDT configuration information provided by the anchor base station when the terminal enters the RRC Inactive state, or includes preset default SDT configuration information.

On the basis of any one of the above-mentioned embodiments, the downlink small data packet includes downlink SDT data or non-access stratum (NAS) signaling.

On the basis of any one of the above-mentioned embodiments, after resuming the SDT-related configuration in the RRC Inactive state, the receiving unit 911 is further configured to receive an RRC resume message sent by the first base station; and the processing unit 912 is further configured to resume the terminal from the RRC Inactive state to an RRC connected (Connected) state according to the RRC resume message.

On the basis of any one of the above-mentioned embodiments, after resuming the SDT-related configuration in the RRC Inactive state, the receiving unit 911 is further configured to receive an RRC release message sent by the first base station; and the processing unit 912 is further configured to stop to receive the SDT downlink small data packet according to the RRC release message, and enter an RRC idle (Idle) state or keep in the RRC Inactive state.

The terminal provided in the embodiment of the present application may be configured to perform the method embodiment for the above-mentioned terminal side, and the specific functions thereof will not be repeated herein.

Figure 12:
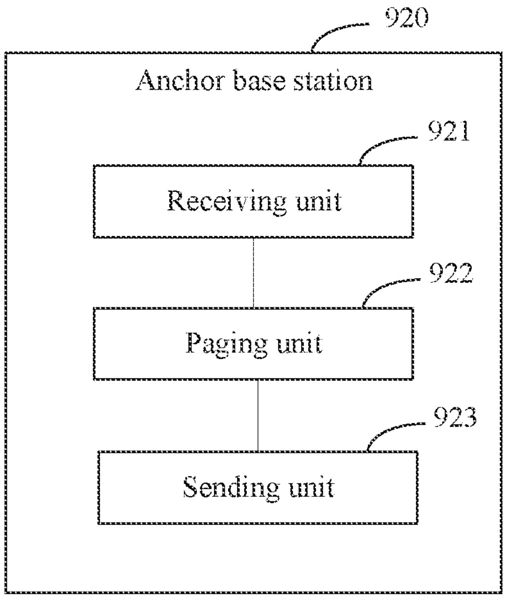
FIG. 12 is a structural diagram of an anchor base station provided in another embodiment of the present application.

FIG. 12 is a structural diagram of an anchor base station provided in an embodiment of the present application. The anchor base station provided in the present embodiment may perform the processing flow provided in the method embodiment for the anchor base station side. As shown in FIG. 12, the anchor base station 920 includes a receiving unit 921, a paging unit 922, and a sending unit 923.

The receiving unit 921 is configured to receive a downlink small data packet from a core network that is to be sent to a terminal in an RRC Inactive state;

the paging unit 922 is configured to send a radio paging message to the terminal, and/or, send a radio access network (RAN) paging message to a non-anchor base station in an RAN-based notification area (RNA), and the non-anchor base station sends a radio paging message to the terminal according to the RAN paging message; where the RAN paging message and the radio paging messages from the anchor base station and the non-anchor base station include indication information on downlink small data transmission (SDT); and the sending unit 923 is configured to, if it is determined that the terminal responds to the radio paging message from the anchor base station or the non-anchor base station, send the downlink small data packet to the terminal directly or through the non-anchor base station.

On the basis of any one of the above-mentioned embodiments, when sending the downlink small data packet to the terminal through the non-anchor base station, the sending unit 923 is configured to:

if it is determined that the terminal responds to the radio paging message from the non-anchor base station, send terminal context information of the terminal to the non-anchor base station; and after performing first processing on the downlink small data packet, send the processed downlink small data packet to the non-anchor base station, and the non-anchor base station performs second processing on the received processed downlink small data packet according to the terminal context information, and sends the downlink small data packet subjected to the second processing to the terminal.

On the basis of any one of the above-mentioned embodiments, when sending the downlink small data packet to the terminal directly, the sending unit 923 is configured to:

if it is determined that the terminal responds to the radio paging message from the anchor base station, perform first processing and second processing on the downlink small data packet, and then, send the downlink small data packet subjected to the first processing and the second processing to the terminal.

On the basis of any one of the above-mentioned embodiments, when sending the terminal context information of the terminal to the non-anchor base station, the receiving unit 921 receives a terminal context information request message sent by the non-anchor base station; and the sending unit 923 sends the terminal context information of the terminal to the non-anchor base station in response to the terminal context information request message.

On the basis of any one of the above-mentioned embodiments, the terminal context information request message includes a maximum SDT data processing capacity of the non-anchor base station; and when sending the terminal context information of the terminal to the non-anchor base station in response to the terminal context information request message, the sending unit 923 is configured to:

if it is determined that a data volume of the downlink small data packet satisfies the maximum data processing capacity of the non-anchor base station, determine that the downlink small data packet is transmitted by adopting an SDT process, and send the terminal context information of the terminal to the non-anchor base station.

On the basis of any one of the above-mentioned embodiments, the terminal context information is SDT-related configuration information of the terminal; or the terminal context information is full context information of the terminal, where the full context information includes the SDT-related configuration information of the terminal.

On the basis of any one of the above-mentioned embodiments, if it is determined that the data volume of the downlink small data packet does not satisfy the maximum data processing capacity of the non-anchor base station, it is determined that the downlink small data packet is transmitted without adopting the SDT process, and the sending unit 923 sends full terminal context information of the terminal and the downlink small data packet to the non-anchor base station to perform anchor transfer, that is, the non-anchor base station is converted into a new anchor base station according to the full terminal context information of the terminal to perform first processing and second processing on the downlink small data packet, and then, send the downlink small data packet subjected to the first processing and the second processing to the terminal.

On the basis of any one of the above-mentioned embodiments, the second processing includes at least one of the following: physical layer processing, media access control (MAC) layer processing, or radio link control (RLC) layer processing;

if the downlink small data packet is non-access stratum (NAS) signaling, the first processing includes: packaging the NAS signaling in an RRC message, and performing packet data convergence protocol (PDCP) processing; or, if the downlink small data packet is downlink SDT data, the first processing includes: performing service data adaptation protocol (SDAP) processing and PDCP processing on the downlink SDT data.

On the basis of any one of the above-mentioned embodiments, when sending the processed downlink small data packet to the non-anchor base station, the sending unit 923 is configured to:

if the downlink small data packet is downlink SDT data, receive downlink SDT data forwarding tunnel information sent by the non-anchor base station;

send the processed downlink small data packet to the non-anchor base station through a downlink SDT data forwarding tunnel; or if the downlink small data packet is NAS signaling, send the processed downlink small data packet to the non-anchor base station through an Xn interface.

On the basis of any one of the above-mentioned embodiments, the sending unit 923 is further configured to: after it is determined that sending the downlink small data packet is completed, generate an RRC release message, and transmit the RRC release message to the terminal, and the terminal stops to receive the downlink small data packet according to the RRC release message, and enters an RRC Idle state or keeps in the RRC Inactive state.

The anchor base station provided in the embodiment of the present application may be configured to perform the method embodiment for the above-mentioned anchor base station side, and the specific functions thereof will not be repeated herein.

Figure 13:
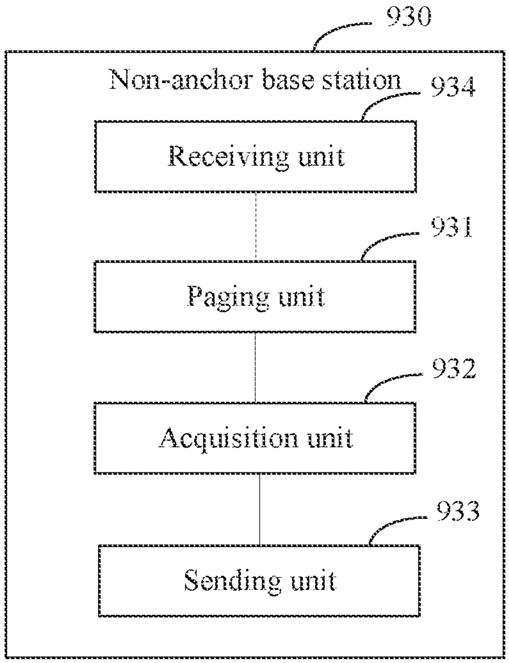
FIG. 13 is a structural diagram of a non-anchor base station provided in another embodiment of the present application.

FIG. 13 is a structural diagram of a non-anchor base station provided in an embodiment of the present application. The non-anchor base station provided in the present embodiment may perform the processing flow provided in the method embodiment for the non-anchor base station side. As shown in FIG. 13, the non-anchor base station 930 includes a paging unit 931, an acquisition unit 932, a sending unit 933, and a receiving unit 934.

The receiving unit 934 is configured to receive a radio access network (RAN) paging message sent by an anchor base station, the RAN paging message being sent by the anchor base station to the non-anchor base station in an RNA;

the paging unit 931 is configured to initiate radio paging to a terminal according to the RAN paging message from the anchor base station, where the RAN paging message and a radio paging message include indication information on downlink small data transmission (SDT), and the terminal is in an RRC Inactive state;

the acquisition unit 932 is configured to, if it is determined that the terminal responds to the radio paging message from the non-anchor base station, acquire terminal context information of the terminal from the anchor base station; and acquire a downlink small data packet subjected to first processing from the anchor base station; and the sending unit 933 is configured to perform second processing on the downlink small data packet according to the terminal context information, and send the downlink small data packet subjected to the second processing to the terminal.

On the basis of any one of the above-mentioned embodiments, when acquiring the terminal context information of the terminal from the anchor base station, the acquisition unit 932 is configured to:

send a terminal context information request message to the anchor base station; and receive the terminal context information of the terminal that is sent by the anchor base station according to the terminal context information request message.

On the basis of any one of the above-mentioned embodiments, the terminal context information request message includes a maximum data processing capacity of the non-anchor base station; and when receiving the terminal context information of the terminal that is sent by the anchor base station according to the terminal context information request message, the acquisition unit 932 is configured to:

receive the terminal context information of the terminal that is sent by the anchor base station after it is determined that a data volume of the downlink small data packet satisfies the maximum data processing capacity of the non-anchor base station.

On the basis of any one of the above-mentioned embodiments, after sending the terminal context information request message to the anchor base station, the acquisition unit 932 is further configured to receive full context information of the terminal and the downlink small data packet that are sent by the anchor base station after it is determined that a data volume of the downlink small data packet does not satisfy a maximum data processing capacity of the non-anchor base station; and the sending unit 933 is further configured to convert into a new anchor base station according to the full context information of the terminal, and send an RRC resume message to the terminal, and the terminal resumes from the RRC Inactive state to an RRC Connected state; and perform first processing and second processing on the downlink small data packet according to the full context information of the terminal, and then, send the downlink small data packet subjected to the first processing and the second processing to the terminal.

On the basis of any one of the above-mentioned embodiments, when acquiring the downlink small data packet subjected to the first processing from the anchor base station, the acquisition unit 932 is configured to:

if the downlink small data packet is downlink SDT data, allocate a downlink SDT data forwarding tunnel to the downlink SDT data, and send downlink SDT data forwarding tunnel information to the anchor base station;

receive the downlink small data packet subjected to the first processing sent by the anchor base station through the downlink SDT data forwarding tunnel; or if the downlink small data packet is NAS signaling, receive the downlink small data packet subjected to the first processing sent by the anchor base station through an Xn interface.

The non-anchor base station provided in the embodiment of the present application may be configured to perform the method embodiment for the above-mentioned non-anchor base station side, and the specific functions thereof will not be repeated herein.

It should be noted that division of units in the above-mentioned embodiments of the present application is schematic and is only logic function division, and there may be other division manners during actual implementation. In addition, all the functional units in each of the embodiments of the present application may be integrated in one processing unit, or all the units physically exist alone, or two or more units are integrated in one unit. The above-mentioned integrated unit may be realized in a form of hardware or a software functional unit.

When being realized in the form of the software functional unit and used as an independent product to be sold or used, the integrated unit may be stored in a processor-readable storage medium. Based on such understanding, the embodiments of the present application or parts thereof making contributions to the prior art or all or parts of the embodiments may be embodied in a form of a software product, and the computer software product is stored in a storage medium and includes instructions used to cause a computer device (which may be a personal computer, a server, or a network device, etc.) or a processor to perform all or parts of steps of the method in each of the embodiments of the present application. The aforementioned storage medium includes various media, such as a U disk, a mobile hard disk, a Read-Only Memory (Read-Only Memory, ROM), a Random Access Memory (Random Access Memory, RAM), a diskette or an optical disk, capable of storing program codes.

Another embodiment of the present application further provides a computer-readable storage medium, where the computer-readable storage medium has a computer program stored thereon, and the computer program is configured to cause a processor to perform the data transmission method for a terminal side, or an anchor base station side or a non-anchor base station side.

The computer-readable storage medium may be any available medium or data storage device that can be accessed by a processor, which includes but is not limited to a magnetic memory (such as a floppy disk, a hard disk, a magnetic tape, and a magneto-optical disc (MO)), an optical memory (such as a CD (compact disc), a DVD (digital video disc), a BD (blu-ray disc), and an HVD (high-definition versatile disc)), and a semiconductor memory (such as an ROM, an EPROM (erasable programmable ROM), an EEPROM (Electrically EPROM), a nonvolatile memory (NAND FLASH), and a solid-state disk (SSD)).

Another embodiment of the present application further provides a computer program product, including a computer program, and the computer program is configured to cause a processor to perform the data transmission method for a terminal side, or an anchor base station side or a non-anchor base station side.

The embodiments of the present application may be provided as a method, a system or a computer program product. Therefore, forms of a complete hardware embodiment, a complete software embodiment or a software and hardware aspect combined embodiment may be adopted in the present application. In one embodiment, a form of a computer program product executed on one or more computer available storage media (including but not limited to a magnetic disk memory and an optical memory) including computer available program codes may be adopted in the present application.

The present application is described by referring to flow diagrams and/or block diagrams of the method, device (system) and computer program product according to the embodiments of the present application. It should be understood that each flow and/or block in the flow diagrams and/or block diagrams as well as a combination of flows and/or blocks in the flow diagrams and/or block diagrams may be realized by computer-executable instructions. The computer-executable instructions may be provided to a general-purpose computer, a special-purpose computer, an embedded processor or processors of other programmable data processing devices to generate a machine, and an apparatus for realizing functions specified in one or more flows in the flow diagrams and/or one or more blocks in the block diagrams is generated through the instructions executed by the computer or the processors of other programmable data processing devices.

These processor-executable instructions may also be stored in a processor-readable memory capable of guiding the computer or other programmable data processing devices to work in a specific way, and the instructions stored in the processor-readable memory generate a product including an instruction apparatus, and the instruction apparatus realizes the functions specified in the one or more flows in the flow diagrams and/or one or more blocks in the block diagrams.

These processor-executable instructions may also be loaded in the computer or other programmable data processing devices, and a series of operation steps are performed on the computer or other programmable data processing devices to generate processing realized by the computer, and the instructions executed on the computer or other programmable data processing devices provide steps for realizing the functions specified in the one or more flows in the flow diagrams and/or one or more blocks in the block diagrams.

Various alterations and transformations on the present application may be made without departing from the spirit and scope of the present application. In this way, if these alterations and transformations of the present application fall within the scope of the claims of the present application and equivalent technologies of the claims, the present application is also intended to include these alterations and transformations.

The invention claimed is:

1. A data transmission method, applied to a terminal, wherein the method comprises:

receiving a radio paging message from a first base station to the terminal, wherein the radio paging message comprises indication information on downlink small data transmission (SDT), the terminal is in a radio resource control (RRC) Inactive state, and the first base station is an anchor base station or a non-anchor base station;

resuming SDT-related configuration in the RRC Inactive state according to the indication information on the downlink SDT comprised in the radio paging message; and receiving, according to the resumed SDT-related configuration, a downlink small data packet sent by the first base station.

2. The method according to claim 1, wherein the resuming the SDT-related configuration in the RRC Inactive state comprises:

resuming SDT-related radio bearer configuration according to preset SDT-related radio bearer configuration information, and sending an RRC resume request message to the first base station, the RRC resume request message being configured to request the first base station to resume SDT-related radio bearer.

3. The method according to claim 1, wherein after the resuming the SDT-related configuration in the RRC Inactive state, the method further comprises:

receiving an RRC resume message sent by the first base station; and resuming the terminal from the RRC Inactive state to an RRC Connected state according to the RRC resume message.

4. The method according to claim 1, wherein after the resuming the SDT-related configuration in the RRC Inactive state, the method further comprises:

receiving an RRC release message sent by the first base station; and stopping to receive the downlink small data packet according to the RRC release message, and entering an RRC Idle state or keeping in the RRC Inactive state.

5. A data transmission method, applied to an anchor base station, wherein the method comprises:

receiving a downlink small data packet from a core network that is to be sent to a terminal in a radio resource control (RRC) Inactive state;

performing at least one of: sending a radio paging message to the terminal, or, sending a radio access network (RAN) paging message to a non-anchor base station in an RAN-based notification area (RNA), the RAN paging message being configured to instruct the non-anchor base station to send the radio paging message to the terminal; wherein the RAN paging message and the radio paging message comprise indication information on downlink small data transmission (SDT); and if it is determined that the terminal responds to the radio paging message, sending the downlink small data packet to the terminal directly or through the non-anchor base station.

6. The method according to claim 5, wherein the sending the downlink small data packet to the terminal through the non-anchor base station comprises:

if it is determined that the terminal responds to the radio paging message sent by the non-anchor base station, sending terminal context information of the terminal to the non-anchor base station; and after performing first processing on the downlink small data packet, sending the processed downlink small data packet to the non-anchor base station, and the non-anchor base station performs second processing on the received processed downlink small data packet according to the terminal context information, and sends the downlink small data packet subjected to the second processing to the terminal.

7. The method according to claim 5, wherein the sending the downlink small data packet to the terminal directly comprises:

if it is determined that the terminal responds to the radio paging message from the anchor base station, performing first processing and second processing on the downlink small data packet, and then, sending the downlink small data packet subjected to the first processing and the second processing to the terminal.

8. The method according to claim 6, wherein if the downlink small data packet is non-access stratum (NAS) signaling, the first processing comprises: packaging the NAS signaling in an RRC message, and performing packet data convergence protocol (PDCP) processing; or, if the downlink small data packet is downlink SDT data, the first processing comprises: performing service data adaptation protocol (SDAP) processing and PDCP processing on the downlink SDT data; and the second processing comprises at least one of the following: physical layer processing, media access control (MAC) layer processing, or radio link control (RLC) layer processing.

9. The method according to claim 6, wherein the sending the terminal context information of the terminal to the non-anchor base station comprises:

receiving a terminal context information request message sent by the non-anchor base station; and sending the terminal context information of the terminal to the non-anchor base station in response to the terminal context information request message.

10. The method according to claim 6, wherein the sending the processed downlink small data packet to the non-anchor base station comprises:

if the downlink small data packet is downlink SDT data, sending the processed downlink small data packet to the non-anchor base station through a downlink SDT data forwarding tunnel allocated by the non-anchor base station; or if the downlink small data packet is non-access stratum (NAS) signaling, sending the processed downlink small data packet to the non-anchor base station through an Xn interface.

11. The method according to claim 5, wherein the method further comprises:

after it is determined that sending the downlink small data packet is completed, generating an RRC release message, and transmitting the RRC release message to the terminal, and the terminal stops to receive the downlink small data packet according to the RRC release message, and enters an RRC Idle state or keeps in the RRC Inactive state.

12. A data transmission method, applied to a non-anchor base station, wherein the method comprises:

receiving a radio access network (RAN) paging message sent by an anchor base station, the RAN paging message being sent by the anchor base station to the non-anchor base station in an RAN-based notification area (RNA);

initiating radio paging to a terminal according to the RAN paging message from the anchor base station, wherein the RAN paging message and a radio paging message comprise indication information on downlink small data transmission (SDT), and the terminal is in a radio resource control (RRC) Inactive state;

if it is determined that the terminal responds to the radio paging message from the non-anchor base station, acquiring terminal context information of the terminal and a downlink small data packet subjected to first processing from the anchor base station; and performing second processing on the downlink small data packet according to the terminal context information, and sending the downlink small data packet subjected to the second processing to the terminal.

13. The method according to claim 12, wherein the acquiring the terminal context information of the terminal from the anchor base station comprises:

sending a terminal context information request message to the anchor base station; and receiving the terminal context information of the terminal that is sent by the anchor base station according to the terminal context information request message.

14. A terminal, comprising: a memory, a transceiver, and a processor;

the memory being configured to store a computer program; the transceiver being configured to transceive data under control of the processor; and the processor being configured to read the computer program in the memory and perform the data transmission method according to claim 1.

15. The terminal according to claim 14, wherein when resuming the SDT-related configuration in the RRC Inactive state, the processor is configured to:

resume SDT-related radio bearer configuration according to preset SDT-related radio bearer configuration information, and send an RRC resume request message to the first base station, the RRC resume request message being configured to request the first base station to resume SDT-related radio bearer.

16. The terminal according to claim 14, wherein after resuming the SDT-related configuration in the RRC Inactive state, the processor is further configured to:

receive an RRC resume message sent by the first base station; and resume the terminal from the RRC Inactive state to an RRC Connected state according to the RRC resume message.

17. The terminal according to claim 14, wherein after resuming the SDT-related configuration in the RRC Inactive state, the processor is further configured to:

receive an RRC release message sent by the first base station; and stop to receive the downlink small data packet according to the RRC release message, and enter an RRC Idle state or keep in the RRC Inactive state.

18. An anchor base station, comprising: a memory, a transceiver, and a processor;

the memory being configured to store a computer program; the transceiver being configured to transceive data under control of the processor; and the processor being configured to read the computer program in the memory and perform the data transmission method according to claim 5.

19. The anchor base station according to claim 18, wherein when sending the downlink small data packet to the terminal through the non-anchor base station, the processor is configured to:

if it is determined that the terminal responds to the radio paging message sent by the non-anchor base station, send terminal context information of the terminal to the non-anchor base station; and after performing first processing on the downlink small data packet, send the processed downlink small data packet to the non-anchor base station, so that the non-anchor base station performs second processing on the received processed downlink small data packet according to the terminal context information, and sends the downlink small data packet subjected to the second processing to the terminal.

20. A non-anchor base station, comprising: a memory, a transceiver, and a processor;

the memory being configured to store a computer program; the transceiver being configured to transceive data under control of the processor; and the processor being configured to read the computer program in the memory and perform the data transmission method according to claim 12.

* * * * *